US009529887B2

United States Patent
Davies

(10) Patent No.: US 9,529,887 B2
(45) Date of Patent: Dec. 27, 2016

(54) EFFICIENT DETECTION OF INFORMATION OF INTEREST USING GREEDY-MODE-BASED GRAPH CLUSTERING

(71) Applicant: Palo Alto Research Center Incorporated, Palo Alto, CA (US)

(72) Inventor: Daniel Davies, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 481 days.

(21) Appl. No.: 14/102,283

(22) Filed: Dec. 10, 2013

(65) Prior Publication Data
US 2015/0161229 A1   Jun. 11, 2015

(51) Int. Cl.
G06F 17/30 (2006.01)
G06F 15/16 (2006.01)
G06Q 30/02 (2012.01)

(52) U.S. Cl.
CPC ... *G06F 17/30598* (2013.01); *G06F 17/30958* (2013.01); *G06Q 30/02* (2013.01)

(58) Field of Classification Search
CPC ................ G06F 17/30598; G06F 17/30864; G06F 17/3071; G06F 15/16
USPC .......................................... 707/737; 709/204
See application file for complete search history.

(56) References Cited

U.S. PATENT DOCUMENTS

| 8,606,787 | B1* | 12/2013 | Asgekar ................. G06Q 50/01 707/737 |
| 8,626,835 | B1* | 1/2014 | Gyongyi ........... G06F 17/30598 709/204 |
| 2013/0013601 | A1* | 1/2013 | Kabiljo ............. G06F 17/30861 707/737 |
| 2013/0198191 | A1* | 8/2013 | Lara Hernandez ........ G06F 17/30598 707/737 |

OTHER PUBLICATIONS

Cordasco et al. "Community Detection via Semi-Synchronous Label Propagation Algorithms". 2010. <http://ieeexplore.ieee.org/stamp/stamp.jsp?tp=&arnumber=5730298>.*

(Continued)

*Primary Examiner* — Hosain Alam
*Assistant Examiner* — Robert F May
(74) *Attorney, Agent, or Firm* — Shun Yao; Park, Vaughan, Fleming & Dowler LLP

(57) ABSTRACT

One embodiment of the present invention provides a computing system, which identifies, for graph clustering, first and second sets of vertices in a graph. A respective vertex in the first set of vertices is an exemplar. A respective vertex in the second set of vertices is not an exemplar and not associated with a vertex identifier. The system assigns a vertex identifier of a first vertex in the first set to a second vertex in the second set based on type and strength of relationship between the vertices. The vertices represent elements in a data set. The vertex identifiers of the first and second vertices do not change before convergence. The system allocates the first vertex and the second vertex to a first vertex cluster associated with the vertex identifier, and detects convergence based on modularity associated with vertex clusters representing information of interest in the data set.

25 Claims, 16 Drawing Sheets

(56) References Cited

OTHER PUBLICATIONS

Cordasco et al. "Community Detection via Semi-Synchronous Label Propagation Algorithms". 2010. /ieeexplore.ieee.org/stamp/stamp.jsp?tp=&arnumber=5730298>.*
Schaeffer, Elisa Satu, "Survey:Graph Clustering", Journal Computer Science Review, vol. 1, Issue 1, Aug. 2007, pp. 27-64.
Clauset, Aaron et al., "Finding Community Structure in Very Large Networks", http://www.ece.unm.edu/ifis/papers/community-moore.pdf, Aug. 2004.
Brandes, Ulrik et al., "On Finding Graph Clusterings with Maximum Modularity", Proceedings of the 33rd international conference on Graph-theoretic concepts in computer science, 2007, pp. 121-132.
Riedy, E. Jason et al., "Parallel Community Detection for Massive Graphs", PPAM'11 Proceedings of the 9th international conference on Parallel Processing and Applied Mathematics, vol. Part I, 2011, pp. 286-296.

\* cited by examiner

EFFICIENT DETECTION OF INFORMATION OF INTEREST USING GREEDY-MODE-BASED GRAPH CLUSTERING

BACKGROUND

Field

The present disclosure relates to data analysis. More specifically, the present disclosure relates to a method and system for efficient data analysis for detecting information of interest.

Related Art

The exponential growth of computing power has made it possible to extract information of interest, such as shopping preferences, social media activities, medical referrals, and e-mail traffic patterns, using efficient data analysis. Such data analysis requirements have brought with them an increasing demand for efficient computation. As a result, equipment vendors race to build larger and faster computing devices with versatile capabilities, such as graph clustering, to calculate information of interest efficiently. However, the computing capability of a computing device cannot grow infinitely. It is limited by physical space, power consumption, and design complexity, to name a few factors. Furthermore, computing devices with higher capability are usually more complex and expensive. More importantly, because an overly large and complex computing device often does not provide economy of scale, simply increasing the capability of a computing device may prove economically unviable.

One way to meet this challenge is to increase the efficiency of data analysis tools used for extracting information of interest from a large and arbitrary data set. Increasing efficiency of data analysis of such a large data set can increase the complexity of the analysis tools, typically not suitable for large-scale real-life deployment. Hence, efficient data analysis techniques additionally require viability of real-life deployment.

Graph clustering is a tool for analyzing large data sets. Typically, the elements in the data set are represented as vertices and the relationships between the elements are represented as edges in a graph. Graph clustering finds clusters (i.e., groups) of similar elements such that the vertices in one cluster are more densely interconnected to each other than they are to vertices in other clusters. In this way, the data set can be viewed at a more abstract level and allows a computing device to determine the information of interest.

While graph clustering brings many desirable features to data analysis, some issues remain unsolved in efficiently obtaining information of interest from large and arbitrary data sets.

SUMMARY

One embodiment of the present invention provides a computing system. The computing system includes a processor and a computer-readable storage medium. The computer-readable storage medium stores instructions which when executed by the processor cause the processor to perform a method. The method comprises identifying, for a first graph clustering, a first set of vertices in a graph. A respective vertex in the first set of vertices is an exemplar of a respective vertex cluster, which is identified by the vertex identifier of the vertex. The method further comprises identifying a second set of vertices in the graph. A respective vertex in the second set of vertices is not an exemplar of a vertex cluster in the graph and not associated with a vertex identifier. The method further comprises assigning a vertex identifier of a first vertex in the first set of vertices to a second vertex in the second set of vertices based on an edge between the first vertex and the second vertex. The first and second vertices represent element in a data set and the edge represents a type and strength of relationship between the vertices. The vertex identifiers of the first vertex and the second vertex do not change before convergence. The method further comprises allocating the first vertex and the second vertex to a first vertex cluster associated with the vertex identifier, and detecting the convergence of the first graph clustering based on allocation of vertex identifier to a respective vertex in the second set of vertices. The vertex cluster represents information of interest in the data set.

In a variation on this embodiment, the method further comprises disregarding input from a respective vertex without a vertex identifier for calculation of mode used for assigning a respective vertex identifier a respective vertex in the graph.

In a variation on this embodiment, in response to an undesired cluster formation, the method further comprises using the first graph clustering as an input to a second graph clustering. The second graph clustering comprises reassigning a second vertex identifier to the second vertex based on the mode of the vertex identifiers that have been assigned to neighbor vertices of the second vertex. The second graph clustering further comprises allocating the second vertex to a second vertex cluster associated with the second vertex identifier, and detecting convergence of the second graph clustering based on the modularity associated with the updated vertex clusters, which include the second vertex cluster, of the graph. The second vertex cluster represents information of interest in the data set.

In a variation on this embodiment, the method further comprises allocating a subset of vertices in the graph to a thread running in the computer for forming vertex clusters. Forming the vertex cluster for the subset of vertices is computed within the thread.

In a variation on this embodiment, the method further comprises representing a plurality of vertex clusters as vertices in a community graph, computing marginal modularity for respective candidate vertex cluster pair in a community graph, and merging two or more vertex clusters based on the marginal modularity.

In a further variation, the computation of the marginal modularity is based on one or more of: (i) weight of edges between the candidate clusters, (ii) weight of all edges in the community graph, and (iii) weight of individual a respective candidate cluster.

In a further variation, the method further comprises adjusting the affect of the weight of all edges in the community graph on the marginal modularity. The affect includes formation of large clusters or formation of small clusters.

In a further variation, the method further comprises removing consolidating edges and merged clusters.

In a further variation, the method further comprises renaming vertices and edge references to the vertices in the community graph.

In a variation on this embodiment, the converging of the vertex cluster further comprises applying an oscillation damping effect.

BRIEF DESCRIPTION OF THE FIGURES

In the figures, like reference numerals refer to the same figure elements.

DETAILED DESCRIPTION

Figure 1A:
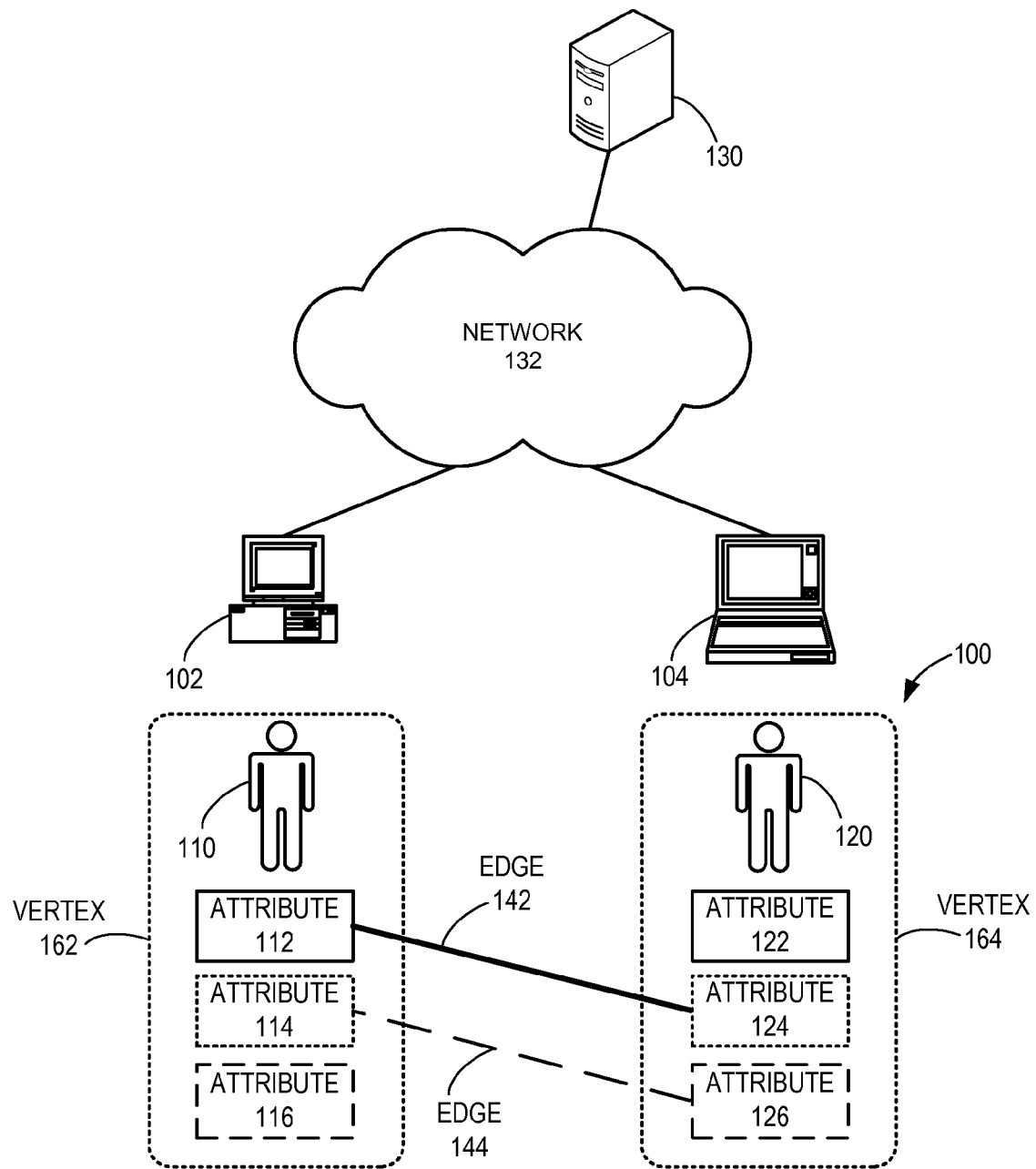
FIG. 1A illustrates an exemplary system for efficient detection of information of interest using mode-based label propagation, in accordance with an embodiment of the present invention. In this context, "mode" means "most commonly occurring." Along with mean and median, it is commonly used to generate one value from a set of values.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently collecting information of interest from large and/or arbitrary data sets is solved by efficient graph clustering using mode-based label propagation. Large data sets do not often present meaningful information. For example, shopping history at a retail store can present an arbitrary set of data without directly indicating information of interest, such as customer shopping preferences or customers with similar shopping preferences. One way of obtaining information of interest is by representing the elements in the data sets and their interrelationships as vertices and edges, respectively, in a graph and clustering the vertices accordingly. With existing tools, graph clustering often is not efficient and may not obtain information of interest within available computational resources and/or desired temporal requirements, and thereby may fail to obtain the information of interest in a viable way.

To solve this problem, the edges between vertices are associated with the type and strength of relationship between the vertices, and used for efficient mode-based label propagation to form graph clusters representing the information of interest. A respective vertex is associated with a unique vertex identifier (i.e., a label). The vertex examines the identifiers of other vertices with which the vertex has an edge (can be referred to as neighbor vertices). Based on the type and strength of relationship indicated by edges with all of its neighbor vertices, the vertex can be assigned the identifier of the neighbor vertex (i.e., the label of the neighbor vertex can be propagated to the vertex). In this way, via one or more iterations of label propagation, a group of vertices are assigned the same identifier. These vertices having the same identifier form a cluster. When a sufficiently small number of vertices change clusters in a label propagation iteration or a global measure of the clustering reaches a desired value (e.g., the maximum), the clustering converges. In this way, clusters representing information of interest are formed in an efficient way.

However, while propagating the label, two neighbor vertices can exchange labels in a respective iteration and have an oscillating effect. In some embodiments, an oscillation damping is applied to the mode calculation to mitigate the oscillating effect. Examples of oscillation damping include, but are not limited to, randomization in label propagation, periodic bias, and oscillation detection. Furthermore, detection of convergence efficiently and accurately is essential for efficient computation. In some embodiments, vertices are distributed across multiple threads for parallel execution. Because the clustering depends on a respective vertex and its neighbor vertices, the set of vertices can be distributed across multiple threads for parallel processing. A respective thread calculates a measure of the quality of a clustering, either based on both local and global perspectives, or on local estimates, and converges the clustering process accordingly. An example of the measure includes, but is not limited to, modularity.

In a respective cluster, every vertex is associated with the same identifier. The original vertex with that identifier can be referred to as the seed vertex or the exemplar of the cluster. In some embodiments, the clusters obtained from mode-based label propagation are used to form new clusters. Only vertices which are seed vertices are assigned an identifier because these vertices are the likely contributors to cluster formation. Vertices which do not have identifiers acquire corresponding identifiers based on mode-based label propagation from neighbors which have identifiers. In some embodiments, vertices with identifiers are not allowed to change identifiers. As a result, the other vertices can evaluate the association with their neighbor vertices without the oscillation effect and can achieve a more distributed graph clustering.

In this disclosure, the term "vertex identifier" refers to any value which can be used to identify a vertex in a graph. The terms "label" and "identifier" have been used interchangeably.

System Architecture

FIG. 1A illustrates an exemplary system for efficient detection of information of interest using mode-based label propagation, in accordance with an embodiment of the present invention. As illustrated in FIG. 1, an information of interest detection system 130 is coupled to a network 132. Examples of network 132 include, but are not limited to, a local area network (LAN), a wide area network (WAN), or the Internet. During operation, system 130 receives input data containing information of interest. In some embodiments, a system administrator provides the input data to system 130. Examples of information of interest include, but are not limited to, shopping preferences, social media activities, referrals (e.g., medical referrals), and e-mail traffic patterns.

In this example, the input data includes information regarding two people 110 and 120. Information regarding person 110 includes attributes 112, 114, and 116, and information regarding person 120 includes attributes 122, 124, and 126. In some embodiments, system 130 collects attributes 112, 114, and 116 while person 110 uses computing device 102, and attributes 122, 124, and 126 while person 120 uses computing device 104, via network 132. Based on the collected attributes, system 130 generates data set 100. Note that these attributes may not be associated with computing devices 102 and 104, or people 110 and 120 (i.e., the attributes in a data set can be arbitrary without corresponding to a person or a device).

System 130 then creates vertex 162 representing the attributes of person 110 and vertex 164 representing the attributes of person 120. Based on the type and strength of relationship between vertices 162 and 164, system 130 creates edges 142 and 144 between vertices 162 and 164. In this way, system 130 can use arbitrary data set 100 with arbitrary attributes, and associates these attributes with corresponding vertices and edges. In some embodiments, data set 100 is a structured data set, wherein data set 100 comprises vertices 162 and 164, and edges 142 and 144 between vertices 162 and 164. System 130 can directly receive the structured data set as well, which is already pre-processed based on the attributes, and because the vertices and edges are already constructed, not require associating the attributes with corresponding vertices and edges. For example, a different physical or virtual system can process the attributes to generate structured data set 100 and provide this structured data set 100 to system 130. System 130 can receive the input data (and/or data set 100) via memory transfer (e.g., via an optical drive, a flash drive), or via network 132.

Unlike having attributes associated with the vertices, system 130 uses the edges to cluster vertices. A respective relationship between the attributes is mapped to an edge between vertices. For example, edges can represent different types of relationships between vertices, such as "is friend of," "is parent of," "source vertex purchased destination vertex" and "source sent email to destination in February." In this way, two vertices can be clustered together based on one or more desired relationships between them. Furthermore, an edge between two vertices can be associated with a weight, which represents the strength of relationship between the vertices. In the example of FIG. 1A, edge 142 represents the relationship between vertices 162 and 164 based on attributes 112 and 124, respectively. Similarly, edge 144 represents the relationship between vertices 162 and 164 based on attributes 114 and 126, respectively. If the relationship represented by edge 142 is stronger than the relationship represented by edge 144, the weight of edge 142 can be more than the weight of edge 144. Note that the weight of edge 142 can be less than the weight of edge 144 if a lower weight indicates stronger relationship.

Based on the type and weight of edges 142 and 144, system 130 can cluster vertices 162 and 164 in a group. This grouping can provide an interpretable abstraction to data set 100 and represent desired information of interest. Suppose that data set 100 includes shopping history at a retail store. Vertex 162 then represents shopping preferences of person 110 while vertex 164 represents shopping preferences of person 120. Edges 142 and 144 can represent the relationship between the shopping preferences of person 110 and person 120. For example, edges 142 and 144 can represent how similarity of preferences (e.g., similar color, clothing type, brand, etc.) and frequency of purchases (e.g., how frequent, when in the year, sale events attendance). By clustering vertices 162 and 164, system 130 can provide information of interest, such as how many people have bought a particular type of clothing at during a particular time of year, or how effective the sale price were at a sale event.

Figure 1B:
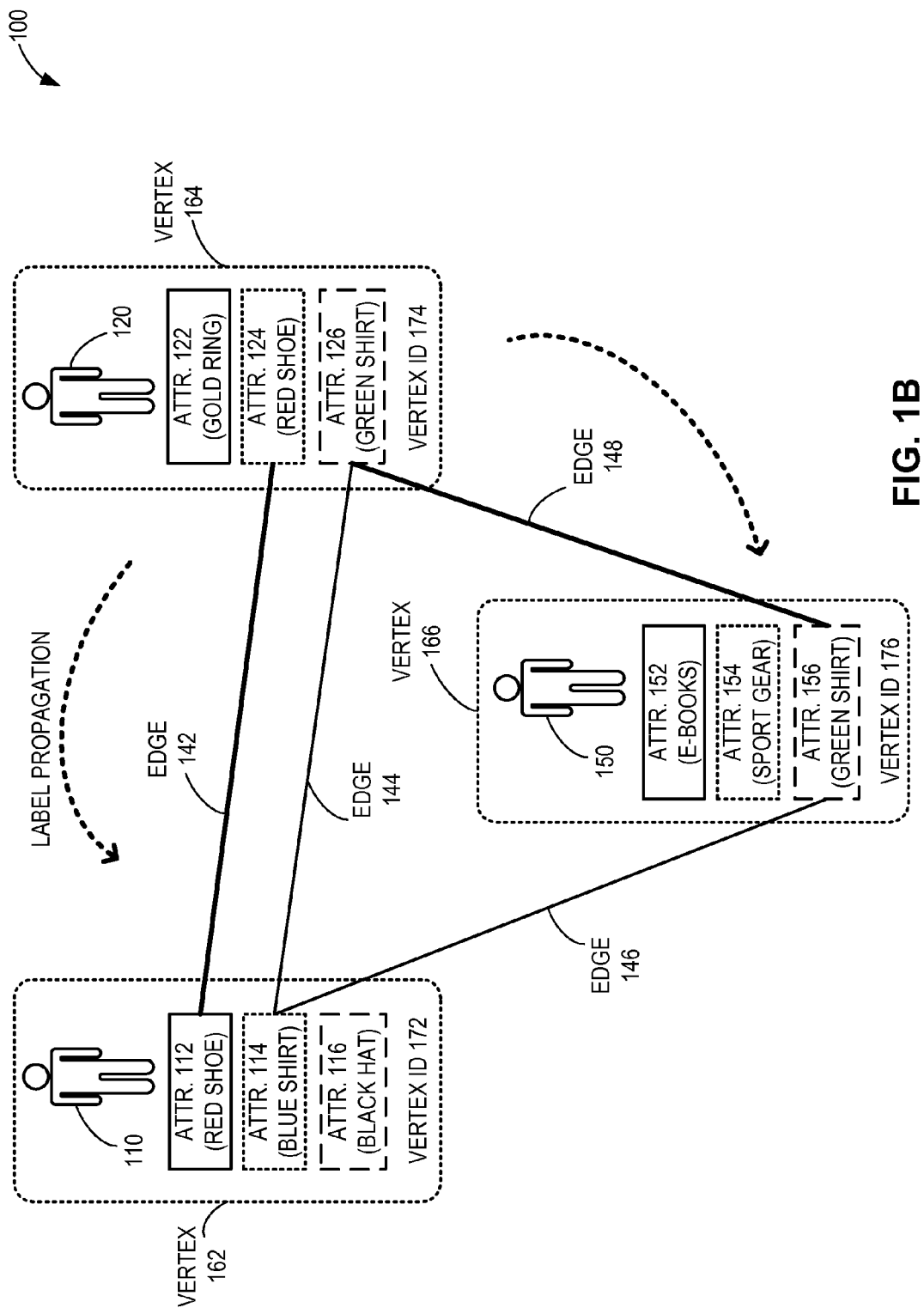
FIG. 1B illustrates an exemplary mode-based label propagation for detection of information of interest, in accordance with an embodiment of the present invention.

In some embodiments, system 130 uses mode-based label propagation to detect information of interest. FIG. 1B illustrates an exemplary mode-based label propagation for detection of information of interest, in accordance with an embodiment of the present invention. In this example, data set 100 further includes information regarding person 150. Information regarding person 150 includes attributes 152, 154, and 156, and is represented by vertex 166. Based on the type and strength of relationship between vertices 162 and 166, system 130 creates edge 146 between vertices 162 and 166. Similarly, based on the type and strength of relationship between vertices 164 and 166, system 130 creates edge 148 between vertices 164 and 166.

Suppose that the attributes represent the shopping history of people 110, 120, and 150. For example, attributes 112, 114, and 116 indicate that person 110 has purchased a pair of red shoes, a blue shirt, and a black hat, respectively. Similarly, attributes 122, 124, and 126 indicate that person 120 has purchased a gold ring, a pair of red shoes, and a green shirt, respectively; and attributes 152, 154, and 156 indicate that person 150 has purchased e-books, a sports gear, and a green shirt, respectively. System 130 analyzes these attributes and represents the shopping history of people 110, 120, and 150 by vertices 162, 164, and 166, respectively. System 130 then assigns vertex identifiers 172, 174, and 176 to vertices 162, 164, and 166, respectively. Vertex identifiers 172, 174, and 176 uniquely identify vertices 162, 164, and 166, respectively, during the graph clustering process.

If the information of interest is the customers with similar shopping preferences, system 130 creates edges between vertices 162, 164, and 166 that represent the similarities between shopping preferences of people 110, 120, and 150. For example, because people 110 and 120 both have purchased shoes, system 130 creates an edge 142 between corresponding vertices 162 and 164. Similarly, because people 110 and 120 both have purchased shirts, system 130 creates an edge 144 between corresponding vertices 162 and 164. In some embodiments, system 130 assigns a weight to a respective edge based on the strength of the relationship.

In this example, people 110 and 120 both have purchased shoes with the same color (e.g., red) and shirts with different colors (e.g., blue and green). Consequently, edge 142, which represents the similarity of shoe purchases, can have a higher weight than edge 144, which represents the similarity of shirt purchases. In some embodiments, multiple edges between two vertices, such as edges 142 and 144 between vertices 162 and 166, can be merged as a single composite edge. The weight of this composite edge can be the sum of the weights of edges 142 and 144.

Furthermore, because people 110 and 150 both have purchased shirts, system 130 creates an edge 146 between corresponding vertices 162 and 166. Similarly, because people 120 and 150 both have purchased shirts, system 130 creates an edge 148 between corresponding vertices 164 and 166. In this example, people 120 and 150 have purchased shirts with the same color (e.g., green); and people 110 and 150 have purchased shirts with different colors (e.g., blue and green). Consequently, edge 148 can have a higher weight than edge 146.

After forming the vertices and edges, system 130 uses the weight of the edges for mode-based label propagation. In some embodiments, system 130 does not use the properties associated with the vertices and relies on the edges for cluster formation. In this way, system 130 can use different types of relationships between the vertices for cluster formation. During operation, system 130 initiates mode-based label propagation and checks neighbor vertices of a respective vertex to determine the label propagation.

For example, system 130 checks the neighbor vertices 164 and 166 of vertex 162, and determines that vertex 162 is most strongly related to vertex 164. Hence, system 130 propagates the label (i.e., the identifier) of vertex 164 to vertex 162, and assigns vertex identifier 174 to vertex 162. Similarly, system 130 determines that vertex 166 is most strongly related to vertex 164, propagates the label of vertex 164 to vertex 166, and assigns vertex identifier 174 to vertex 166. Since the edges are bidirectional, vertex 162 is best connected to vertex 162, system 130 propagates vertex identifier 172 to vertex 164. After this iteration, vertices 162, 164, and 166 have the same vertex identifiers 174, 172 and 174 respectively. After another iteration, vertices 162, 164 and 166 have vertex identifiers 172, 174 and 172, respectively. In this way, system 130 determines that people 110, 120, and 150 have similar shopping histories.

Suppose that edges between respective pair of vertices among vertices 162, 164, and 166 have equal weights (e.g., the summed weight of edges 142 and 144 is equal to the weight of edge 146). Since the vertex weights are equal, in some embodiments, a respective vertex uses lowest (or highest) identifier value to determine the corresponding label propagation. Under such a scenario, vertices 162, 164, and 166 first have identifiers 172, 174, and 176, respectively. After another iteration, vertices 162, 164, and 166 have identifiers 174, 172, and 172, respectively. After yet another iteration, a respective of vertices 162, 164, and 166 has identifier 172. In this way, identifier values can be used to break the tie between edges with equal weights.

In this cluster, vertex 164 can be referred to as the seed vertex or the exemplar of the cluster. In this example, vertices 162 and 166 both receive vertex identifier 174 of seed vertex 164 even though the strength of relationships among the vertices is different (e.g., vertex 162 is more strongly related to vertex 164 than vertex 166). Vertex 166 can be more suited for another cluster, which represents shirt purchases more prominently. In some embodiments, system 130 uses seed vertices from the clusters formed by mode-based label propagation as seeds for "greedy" mode-based label propagation. System 130 only assigns vertex identifier 174 to seed vertex 164 while vertices 162 and 166 remain without identifiers. Because vertex 166 is not associated with any identifier, while performing label propagation for vertex 166, system 130 can explore more options for vertex formation and propagates a label to vertex 166 more greedily. Since greedy mode-based propagation does not change the label of a vertex that already has a label, greedy mode-based propagation can avoid oscillations and provide consistent convergence. This greedy-mode-based label propagation is used for forming new clusters.

During the label propagation, while checking for vertex 164, system 130 can observe that vertex 164 is most strongly related to vertex 162 and assigns identifier 172 of vertex 162 to vertex 164. In this way, vertices 162 and 164 can exchange labels in a respective iteration and have an oscillating effect. In some embodiments, system 130 applies an oscillation damping to the mode calculation to mitigate the oscillating effect. Examples of oscillation damping include, but are not limited to, randomization in label propagation, periodic bias, and oscillation detection. After each iteration, system 130 calculates modularity, either based either on both local and global perspectives, or on local estimates, and converges the clustering process accordingly.

Mode-Based Label Propagation

Figure 2:
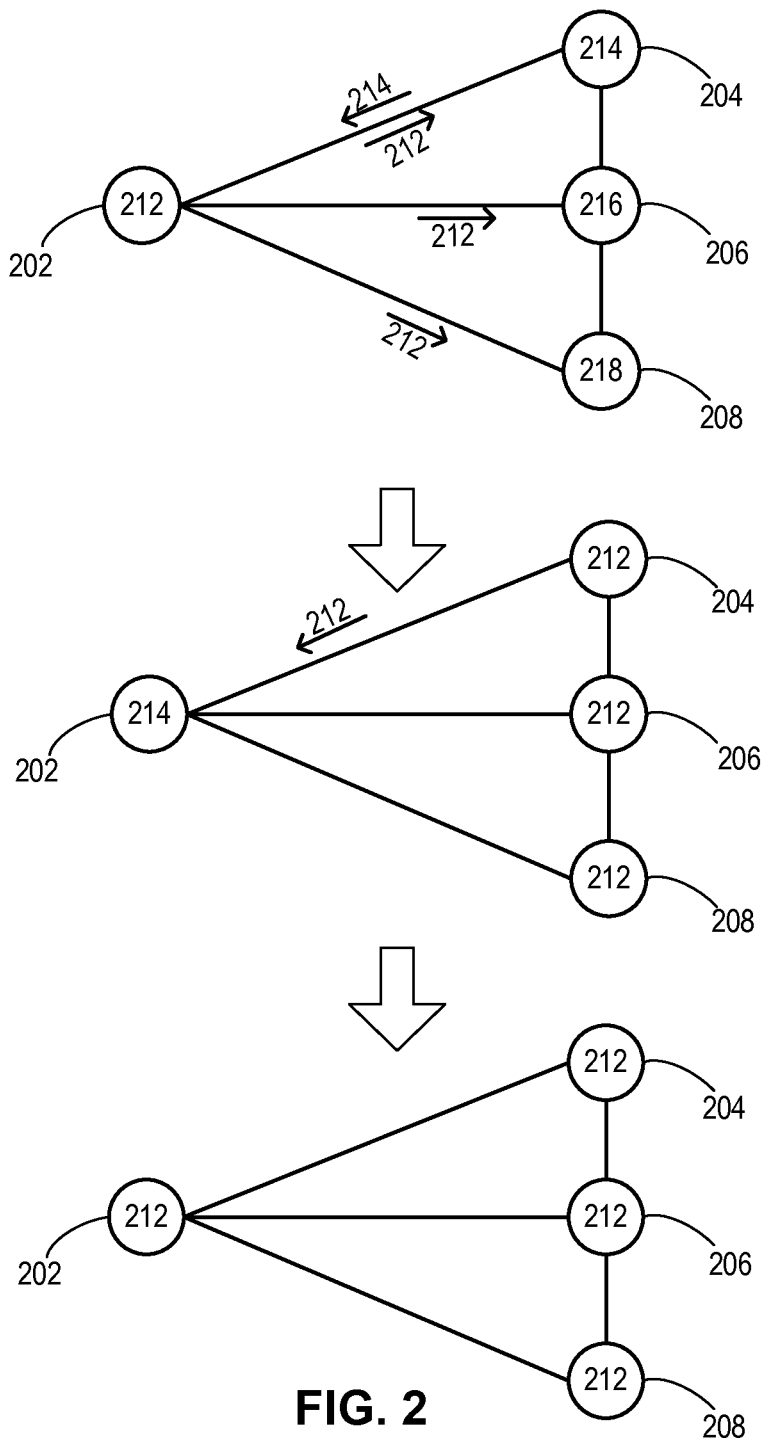
FIG. 2 illustrates an exemplary mode-based label propagation for graph clustering, in accordance with an embodiment of the present invention.

In the example in FIG. 1B, system 130 uses mode-based label propagation for graph clustering, thereby obtaining information of interest from data set 100. FIG. 2 illustrates an exemplary mode-based label propagation for graph clustering, in accordance with an embodiment of the present invention. During operation, an information of interest detection system forms (or receives) vertices 202, 204, 206, and 208 from a data set and allocates labels 212, 214, 216, and 218 to these vertices, respectively. The system uses the weight of the bidirectional edges between these vertices for mode-based label propagation. In some embodiments, a bidirectional edge can be represented by a pair of edges with equal weights having the opposite direction. Suppose that a respective edge between a respective vertex pair has the same weight. In some embodiments, the system uses lowest (or highest) identifier value to determine the corresponding label propagation for edges with equal weights. Under such a scenario, the system checks the neighbor vertices of vertex 202, and determines that vertex 204 is most strongly related to vertex 204 because vertex 204 has the lowest vertex identifier 214 among the neighbors of vertex 202. Hence, the system propagates the label 214 of vertex 204 to vertex 202, and assigns label 214 to vertex 202. Similarly, the system determines that vertices 204, 206, and 208 are most strongly related to vertex 202 because vertex 202 has the lowest vertex identifier 212, propagates label 212 of vertex 202 to vertices 204, 206, and 208, and assigns label 212 to vertices 204, 206, and 208.

After this iteration, vertices 204, 206, and 208 have the same label 212 while vertex 202 has label 214. The system forms a cluster with the vertices 204, 206, and 208, and uses label 212 to identify the cluster. The system then checks convergence of the label propagation (e.g., whether a desired mode has been reached). If not, the system performs another iteration. In this iteration, the system again checks the neighbor vertices of vertex 202, and determines that vertex 202 is most strongly related to vertex 204. Hence, the system propagates the label 212 of vertex 204 to vertex 202, assigns label 212 to vertex 202, and adds vertex 202 to the cluster associated with label 212. The system then checks convergence of the label propagation and determines that all vertices are part of the same cluster and the mode cannot be improved further. Consequently, the system forms a cluster with all vertices labeled 212. In this cluster, vertex 202 can be referred to as the seed vertex or the exemplar of the cluster, and label 212 can be referred to as the cluster identifier.

Suppose that one of the edges, such as the edge between vertices 202 and 206, indicates that vertices 202 and 206 have each other as the neighbor vertex with the strongest relationship (i.e., the edge has a higher weight compared to other edges). As a result, in a respective iteration, vertices 202 and 206 can exchange labels 212 and 216 and lead to an oscillating effect. In some embodiments, the system applies an oscillation damping to the mode calculation to mitigate the oscillating effect. For example, the system can keep track of label assignment of at least three iterations. When vertex 202 receives the label 212 back (i.e., when vertex 202 switches from label 212 to label 216, then from label 216 back to label 212), the system detects that vertex 202 has been associated with label 212 two iterations earlier and determines that vertex 202 has been in an oscillation. The system then applies oscillation damping and converges the clustering process based on the current mode of the clusters.

A label or identifier, such as label 212, can be represented by a number (integer or floating point numbers), a string comprising one or more characters, or both. In some embodiments, labels in the graph are contiguous ranges of unsigned integers. For example, labels 212, 214, 216, and 218 can be integers in a contiguous range. A respective identifier in the range corresponds to a vertex in the graph.

Edges in a graph can be directional or non-directional. If the edges are directional, a directional edge can be an edge in the opposite direction. In some embodiments, a directional edge is represented by the labels of the source and destination vertices. For example, an edge between source vertex 202 and destination vertex 206 can be different from an edge between source vertex 206 and destination vertex 202. In some embodiments, an edge can be further associated with a type, which specifies the relationship between the vertices and a weight, which specifies the strength of the relationship. The type and weight of an edge can be represented by a number, a string comprising one or more characters, or both. Note that two edges, which are in opposite directions, between two vertices can be the same or a different weight. In some embodiments, multiple edges having the same type and direction between two vertices can be a composite edge. The weight of a composite edge can be the sum of the weights of the merged edges.

The system stores vertices 202, 204, 206, and 208, and their corresponding edges in the memory. In some embodiments, the edges are first sorted based on the labels of the source vertices and then based on the type of the edges. This allows the system to place edges with a common source label and type in contiguous memory locations. In some embodiments, a respective vertex, such as vertex 202, has a type table which indicates the first and last edges of a respective type having vertex 202 as the source vertex. If contiguous numbering is used to identify edges, the first and the last edges are sufficient to identify all edges with vertex 202 as the source vertex. Because label 212 of vertex 202 and a type can identify vertex 202's edge, the system only stores the labels 214, 216, and 218 to represent the edges with vertex 202 as the source vertex. The system can store the weights of these edges as well. The system can also maintain a table which maps label 212 of vertex 202 to the type table of vertex 202. This allows the system to quickly obtain the edges associated with vertex 202.

Parallel Execution Model

Figure 3:
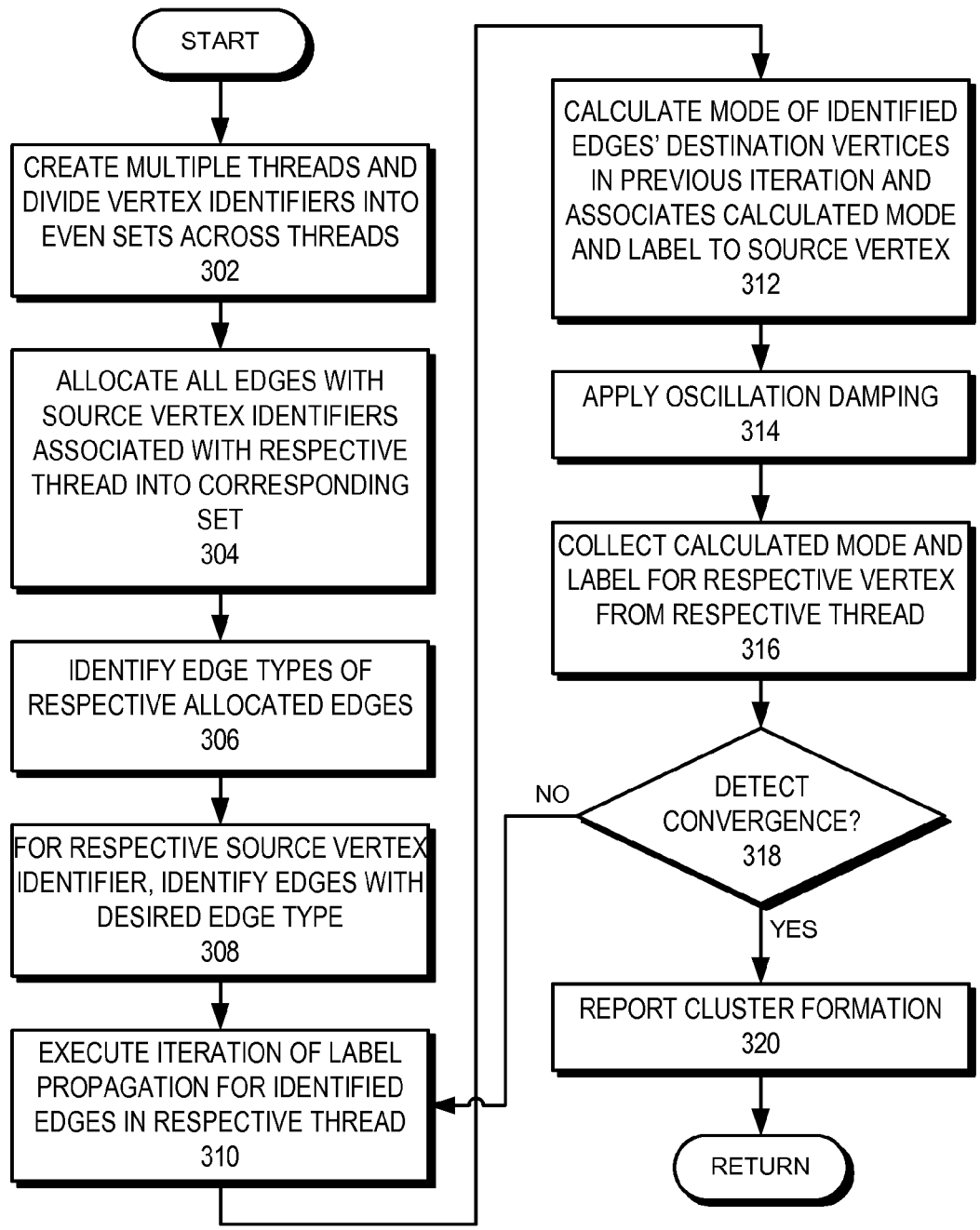
FIG. 3 presents a flowchart illustrating the graph clustering process of an information of interest detection system based on parallel execution of mode-based label propagation, in accordance with an embodiment of the present invention.

In some embodiments, vertices can be distributed across multiple threads for parallel execution. Because the clustering depends on a respective vertex and its neighbor vertices, the set of vertices can be distributed across multiple threads for parallel processing. FIG. 3 presents a flowchart illustrating the graph clustering process of an information of interest detection system based on parallel execution of mode-based label propagation, in accordance with an embodiment of the present invention. During operation, the system creates multiple threads and divides the vertex identifiers into even sets across the threads (operation 302).

The system then allocates all edges with source vertex identifiers associated with a respective thread into the corresponding source set (operation 304). In other words, if the source vertex identifier of an edge is associated with a thread, the edge is allocated to the set corresponding to the thread. The system then identifies the edge types of respective allocated edges (operation 306) and identifies edges with desired edge type for respective source vertex identifier (operation 308). In the example in FIG. 1B, if the desired edge type is shirt purchase history, the system identifies edges 144 and 146 for source vertex 162, and does not identify edge 142.

The system then executes an iteration of label propagation for the identified edges in a respective thread (operation 310). The system calculates the mode of the identified edges' destination vertices in the previous iteration and associates the calculated mode and a label to the source vertex (operation 312). The system applies oscillation damping (operation 314) to mitigate the effect of oscillation. The system then collects the calculated mode and a label for a respective vertex from the respective thread (operation 316) and checks whether convergence has been detected (operation 318). If not, the system executes another iteration of label propagation for the identified edges (operation 310). If the system has detected convergence, the system reports the cluster formation (operation 320). Through this reporting, the system provides the information of interest to a customer.

Mode Calculation

The mode indicates the number of occurrences of a respective unique label over a vertex. In some embodiments, an information of interest detection system sums the weight of edges associated with a respective unique label that is presented to a vertex via the vertex's incoming edges to choose the label with the highest weight as the next label for the vertex. The efficiency of mode-based label propagation (e.g., time consumed for convergence) depends on how quickly the mode of the labels arriving from a potentially large number of edges for a respective vertex can be calculated. In some embodiments, the system uses a hash table for efficient mode calculation. This allows the system to search through a small search space associated with a hash key instead of searching through one long chain that contains a respective label. Since the system uses contiguous integers as labels, the least significant bits of the labels can be used as the hash keys. Using the least significant bits allows the system to quickly generate hash keys.

Furthermore, when the system is checking the mode of labels for a vertex, the hash table has to be reinitialized for a respective vertex. Such an operation can be computationally intensive. In some embodiments, while calculating the mode of labels for a vertex, the system checks selected bits of a respective of the incoming labels (i.e., the labels propagated to the vertex from its neighbor vertices) to each time the hash key is referenced in the hash table. If the label bits in the hash table doesn't match the current label's bits, the hash table entry is assumed to be empty.

Figure 4:
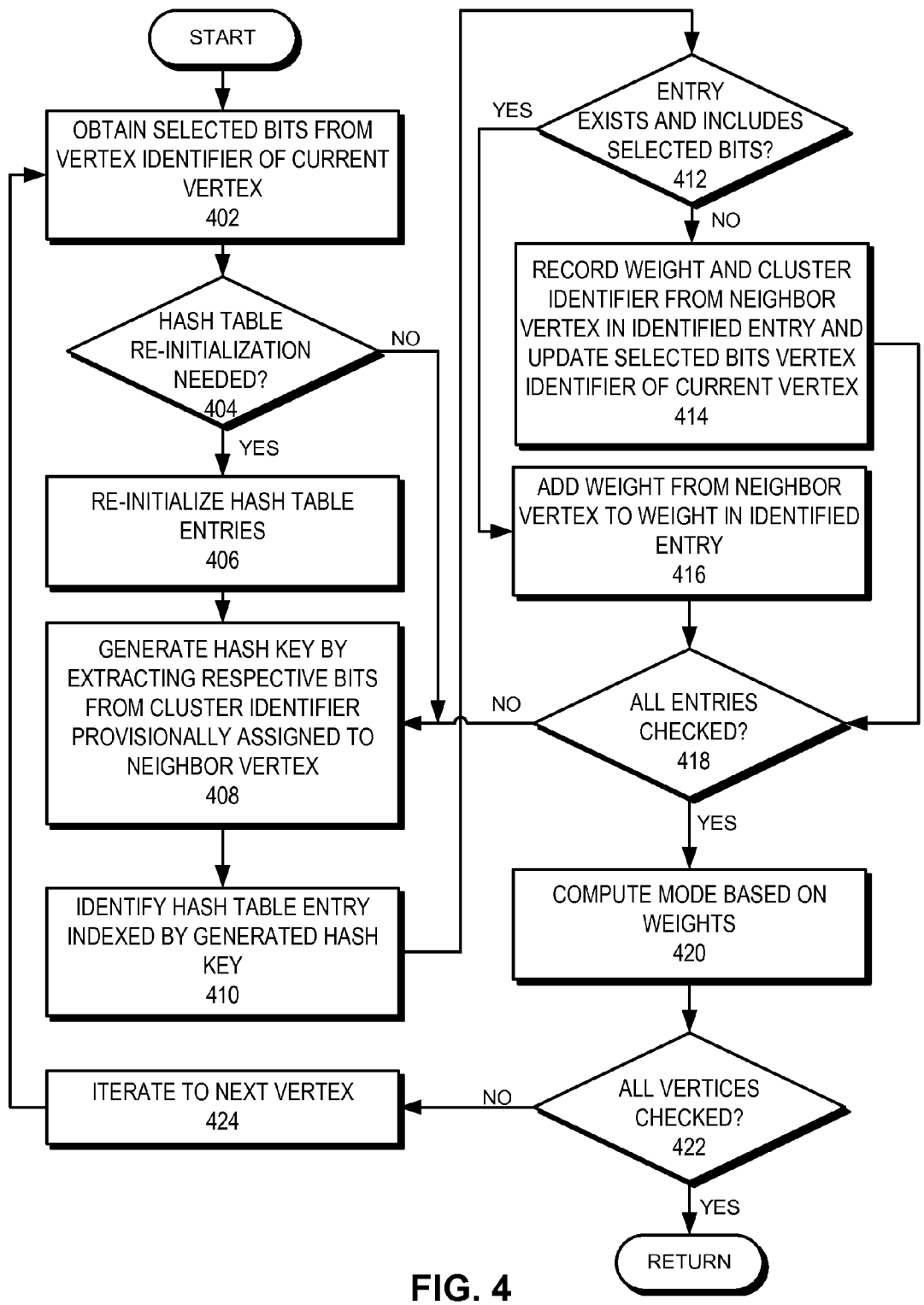
FIG. 4 presents a flowchart illustrating the mode calculation process of an information of interest detection system for mode-based graph clustering, in accordance with an embodiment of the present invention.

FIG. 4 presents a flowchart illustrating the mode calculation process of an information of interest detection system for mode-based graph clustering, in accordance with an embodiment of the present invention. During operation, the system obtains selected bits from the vertex identifier of the current vertex (i.e., the vertex for which the system is calculating the mode of the incoming labels) (operation 402). In some embodiments, the selected bits are the least significant bits. The system then checks whether the hash table requires re-initialization (operation 406). In some embodiments, when the selected number of bits wraps around, the hash table requires re-initialization. If the hash table requires re-initialization, the system re-initializes the hash table entries (operation 414). The system generates a hash key by extracting respective bits from a cluster identifier provisionally assigned to a neighbor vertex of the current vertex (operation 408) and identifies the hash table entry indexed by the generated hash key (operation 410).

The system then checks whether the entry in the hash table exists and includes the selected bits from the vertex identifier of the current vertex (operation 412). If the entry does not exist or include the selected bits, the system records the weight and cluster identifier from the neighbor vertex in the identified entry and updates the selected bits from the vertex identifier of the current vertex (operation 414). Otherwise, the system adds the weight from the neighbor vertex to the weight in the identified entry (operation 416). The system then checks whether all entries associated with the vertex has been checked (operation 418). This allows the system to record the label weights from a respective incoming edge in the corresponding entry in the hash table.

If all entries associated with the vertex has not been checked, the system continues to generate a hash key by extracting respective bits from a cluster identifier provisionally assigned to another neighbor vertex of the current vertex (operation 408) and identifies the hash table entry indexed by the generated hash key (operation 410). If all entries associated with the vertex have been checked, the system computes the mode based on the weights (operation 420). In some embodiments, the system sums the weights to calculate the mode. The system then checks whether all vertices have been checked (operation 422). If not, the system iterates to the next vertex (operation 424) and obtains selected bits from the vertex identifier of that vertex (operation 402). Otherwise, the system concludes the mode calculation.

Oscillation Damping

Figure 5A:
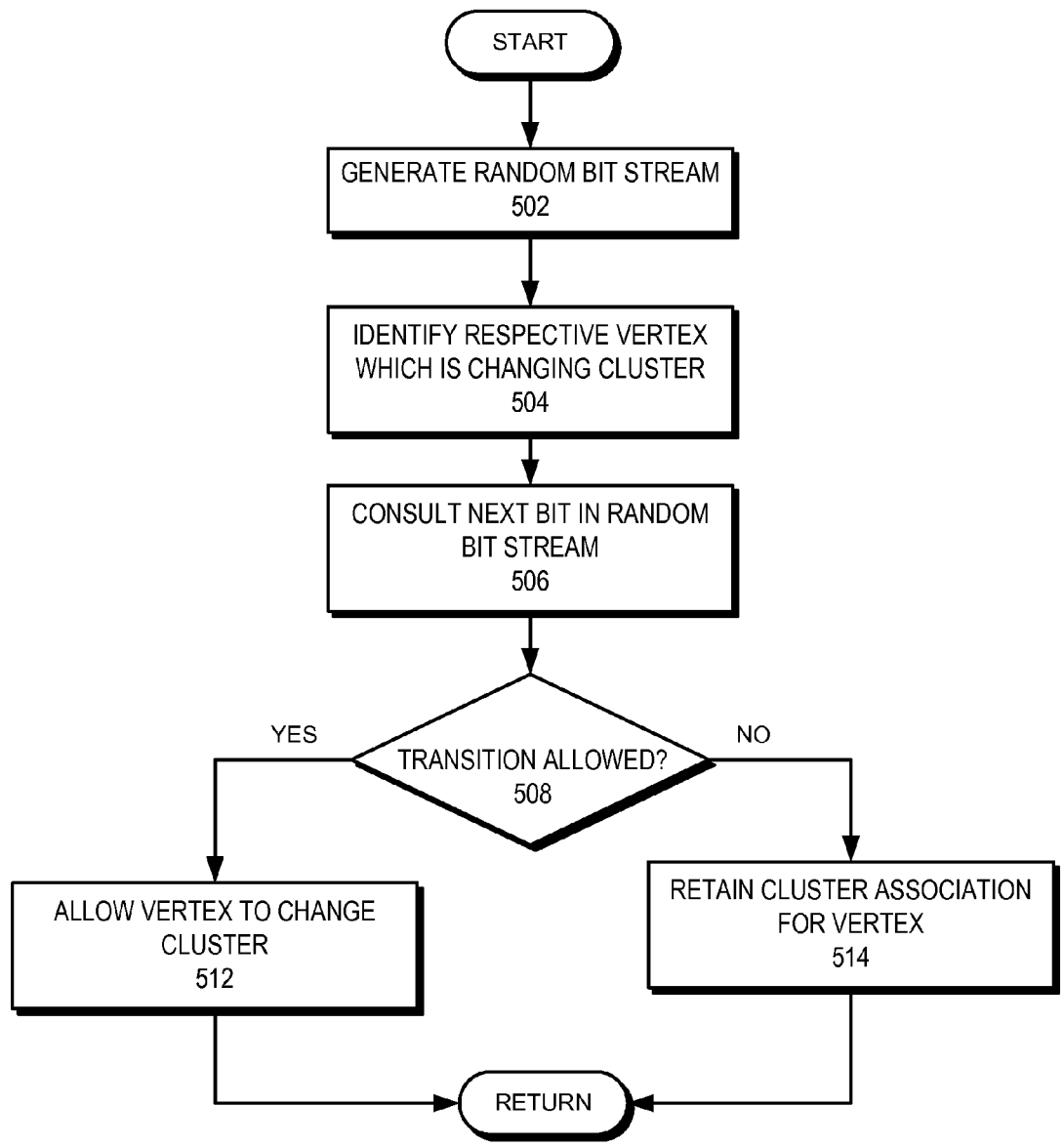
FIG. 5A presents a flowchart illustrating the oscillation damping process of an information of interest detection system for mode-based graph clustering based on random update prevention, in accordance with an embodiment of the present invention.

Suppose that, in the example in FIG. 2, vertices 202 and 206 have each other as the neighbor vertex with the strongest relationship (i.e., the edge with the highest weight). As a result, vertices 202 and 206 can exchange labels 212 and 216 in each iteration which leads to an oscillating effect. In effect, vertices 202 and 206 represent a sub-cluster whose members oscillate between a pair of different clusters. Oscillation damping allows the vertices of such a sub-cluster to be assigned to the same cluster. In some embodiments, an information of interest detection system applies an oscillation damping to the mode calculation to mitigate the oscillating effect. Examples of oscillation damping include, but are not limited to, randomization in label propagation, periodic bias, and oscillation detection. FIG. 5A presents a flowchart illustrating the oscillation damping process of an information of interest detection system for mode-based graph clustering based on random update prevention, in accordance with an embodiment of the present invention. During operation, the system generates a random bit stream (operation 502), which is used for random update prevention.

The system then identifies a respective vertex which is changing its cluster (operation 504) and consults the next bit in the random bit stream (operation 506). The system checks, based on the consultation, whether transition of the cluster is allowed for the vertex (operation 508). In some embodiments, a "1" in the bit stream indicates allowance of the transition and a "0" in the bit stream indicates prevention of the transition (or vice versa). If the transition is allowed, the system allows the vertex to change the cluster (operation 512). Otherwise, the system retains the cluster association for the vertex (operation 514) (i.e., prevents the cluster transition). In this way, the system randomly prevents the symmetry of oscillating clusters so that the majority of the sub-cluster of vertices involved in an oscillation eventually join the same cluster. This pulls the remaining vertices in the sub-cluster toward that cluster.

Figure 5B:
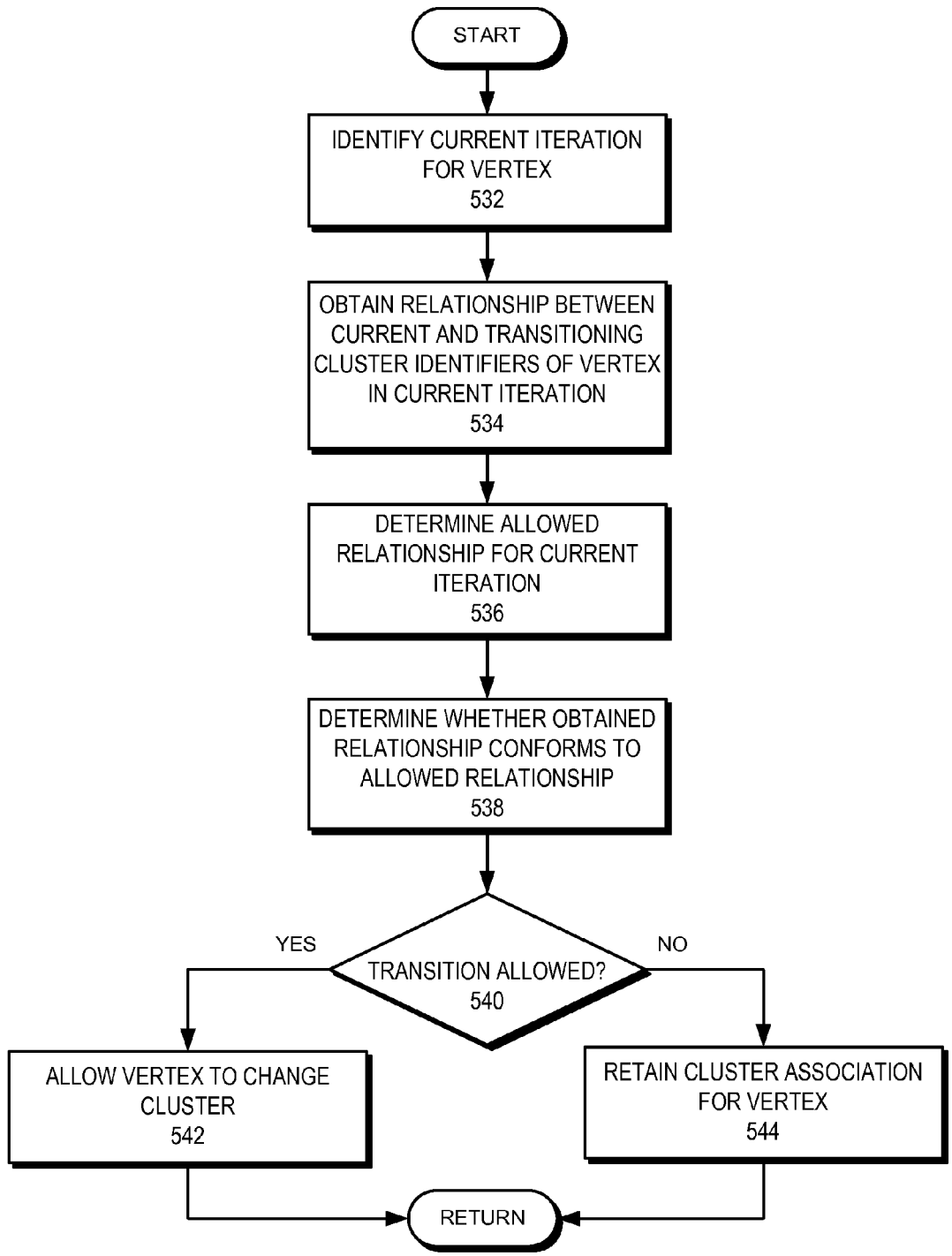
FIG. 5B presents a flowchart illustrating the oscillation damping process of an information of interest detection system for mode-based graph clustering based on periodic bias, in accordance with an embodiment of the present invention.

FIG. 5B presents a flowchart illustrating the oscillation damping process of an information of interest detection system for mode-based graph clustering based on periodic bias, in accordance with an embodiment of the present invention. Upon determining the current iteration for a vertex (operation 532), the system obtains the relationship between the current and transitioning cluster identifiers of the vertex in the current iteration (operation 534). In some embodiments, the system uses "greater than" and/or "less than" relationships between the cluster identifiers. The system then determines the allowed relationship for the current iteration (operation 536) and determines whether the obtained relationship conforms to the allowed relationship (operation 538).

In some embodiments, the system allows one iteration without any relationship bias (i.e., the obtained relationship indicates "no relationship") for a "greater than" (or less than) relationship in every three iterations. In other words, in every four iterations, a bias is applied in three iterations and no bias is applied in the fourth iteration. Under such a scenario, for checking conformation with the allowed relationship, if the allowed relationship is a "greater than" (or the "less than") relationship, the system determines whether the obtained relationship is a "greater than" (or "less than") relationship. If the allowed relationship is a "no relationship," which indicates a no bias, the system simply determines that the obtained relationship conforms to the allowed relationship. Based on the determination, the system checks whether a transition is allowed (operation 540). If the transition is allowed, the system allows the vertex to change the cluster (operation 542). Otherwise, the system retains the cluster association for the vertex (operation 544) (i.e., prevents the cluster transition). In this way, the system uses periodic bias to apply oscillation damping and leads to convergence.

Figure 5C:
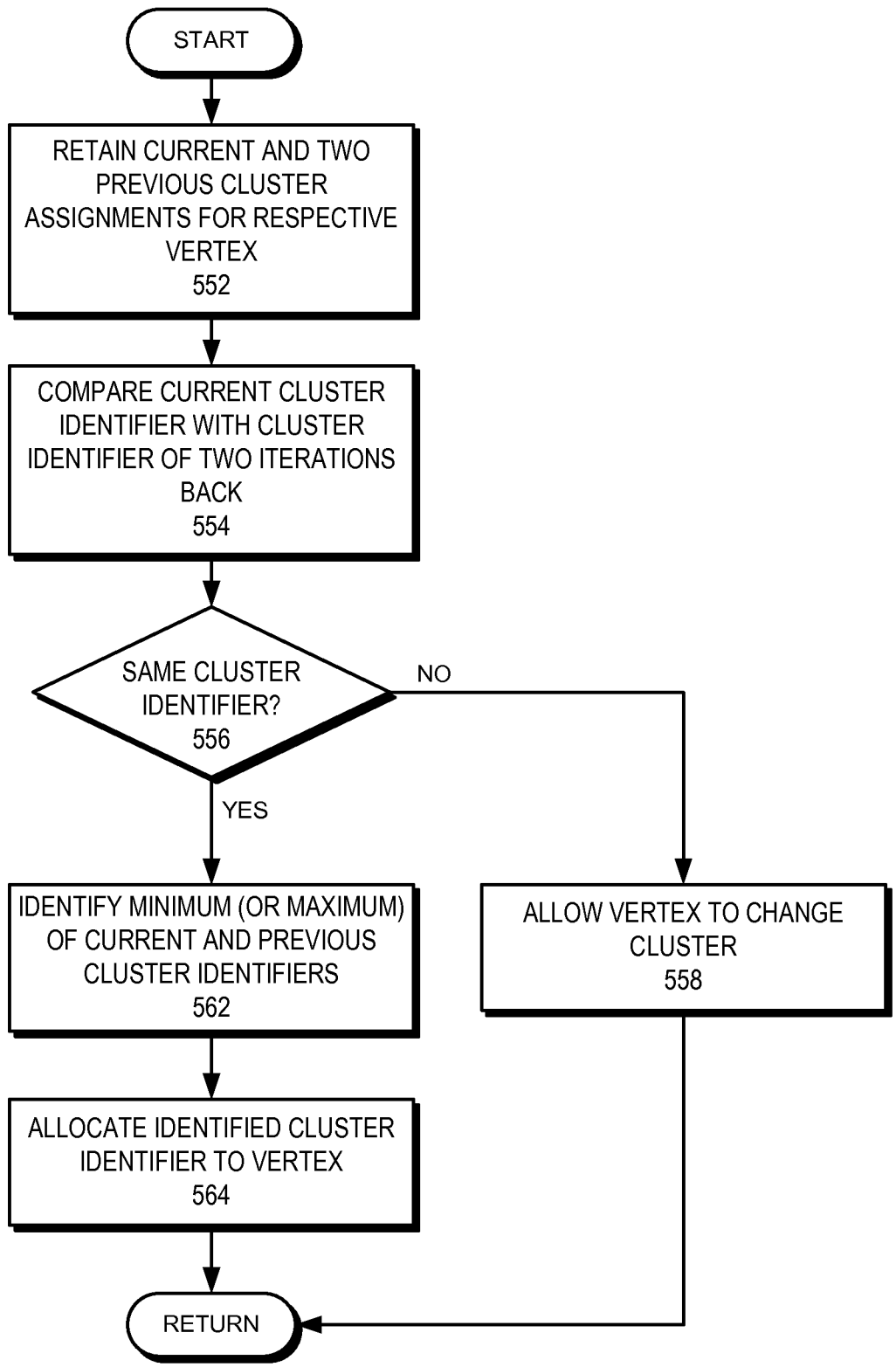
FIG. 5C presents a flowchart illustrating the oscillation damping process of an information of interest detection system for mode-based graph clustering based on oscillation detection, in accordance with an embodiment of the present invention.

FIG. 5C presents a flowchart illustrating the oscillation damping process of an information of interest detection system for mode-based graph clustering based on oscillation detection, in accordance with an embodiment of the present invention. During operation, for a respective vertex, the system retains the cluster assignment of current and two previous iterations (operation 552). The system then compares the current cluster identifier with the cluster identifier of two iterations back (operation 554) and checks whether the cluster identifiers are the same (operation 556), as described in conjunction with FIG. 2. If not, the system does not detect any oscillation and allows the vertex to change cluster (operation 558). Otherwise, the system identifies the minimum (or maximum) of the current and previous cluster identifiers (operation 562) and allocates the identified cluster identifier to the vertex (operation 564). This supplies a bias to the vertices of oscillating sub-clusters, causing the vertices to collapse to the same cluster.

Detecting Convergence

Figure 6A:
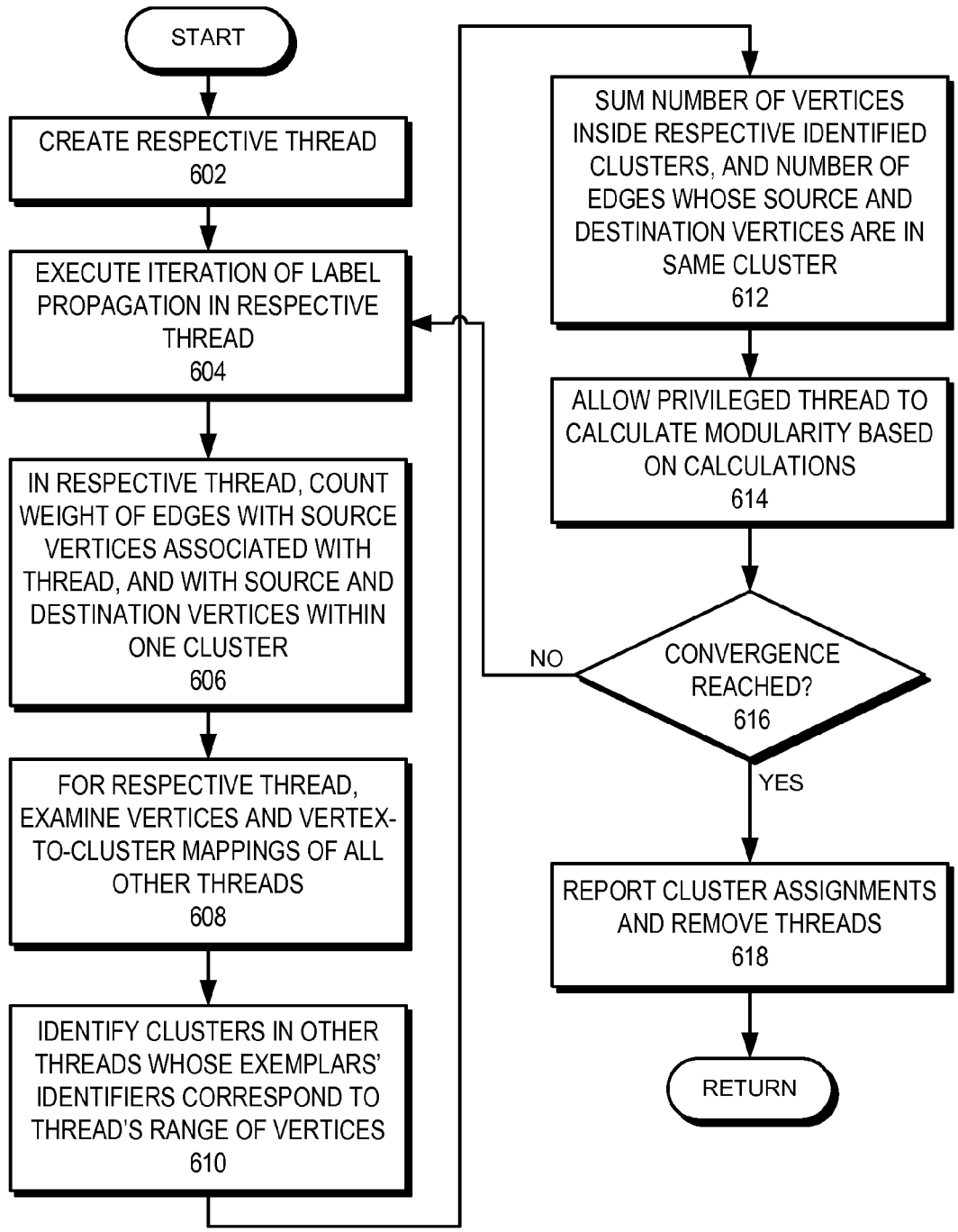
FIG. 6A presents a flowchart illustrating the convergence detection process of an information of interest detection system for mode-based graph clustering based on a query with embedded modularity calculation, in accordance with an embodiment of the present invention.

Detecting convergence based on the desired cluster formation is essential for efficient graph clustering. FIG. 6A presents a flowchart illustrating the convergence detection process of an information of interest detection system for mode-based graph clustering based on a query with embedded modularity calculation, in accordance with an embodiment of the present invention. Upon creating a respective thread (operation 602), as described in conjunction with FIG. 3, the system executes an iteration of label propagation in respective thread (operation 604), as described in conjunction with FIG. 2. In a respective thread, the system counts the weights of edges with source vertices associated with the thread (i.e., the source vertex identifiers corresponding to the thread's range of vertices), and with source and destination vertices within one cluster (operation 606).

For a respective thread, the system then examines the vertices and vertex-to-cluster mappings of all other threads (operation 608) and identifies the clusters in these other threads whose exemplars' identifiers correspond to the thread's range of vertices (operation 610). The system then sums the number of vertices inside the respective identified clusters and the number of edges whose source and destination vertices are in the same cluster (operation 612). A privileged thread can examine all other threads for modularity. The system allows this privileged thread to calculate modularity based on the calculations (operation 614) and check whether the convergence has been reached (operation 616) by checking whether the modularity has reached a peak. If the convergence has not been reached, the system executes another iteration of label propagation in the respective thread (operation 604). Otherwise, the system reports the cluster assignments and removes the threads (operation 618).

Figure 6B:
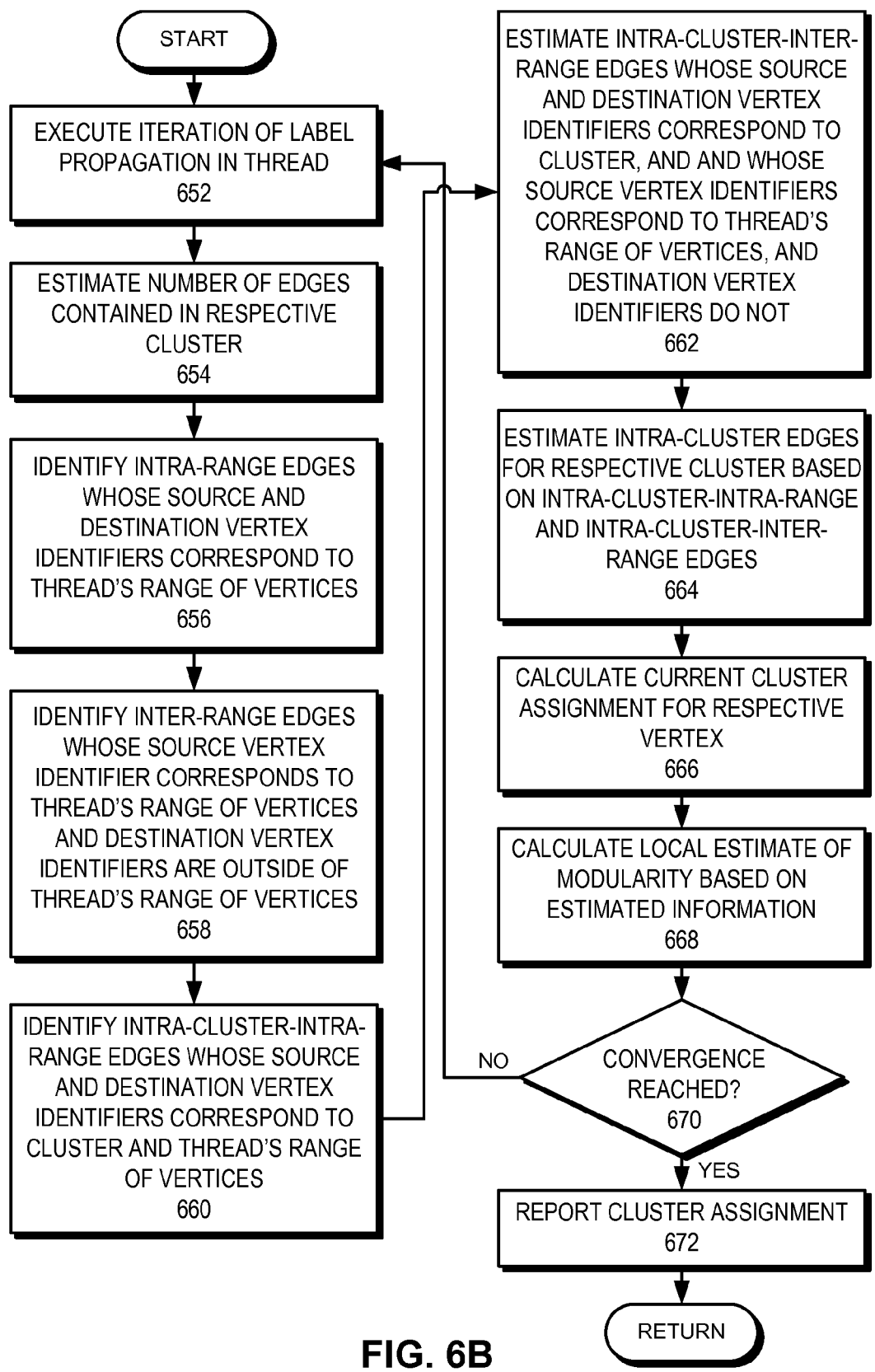
FIG. 6B presents a flowchart illustrating the convergence detection process of a thread in an information of interest detection system for mode-based graph clustering based on a local estimate of modularity, in accordance with an embodiment of the present invention.

In some embodiments, a respective thread can independently estimate the global modularity. This decreases the number of times the threads are stopped during an iteration of the query, thereby reducing the memory bandwidth requirement. Furthermore, this can facilitate an efficient parallel execution of graph clustering. FIG. 6B presents a flowchart illustrating the convergence detection process of a thread in an information of interest detection system for mode-based graph clustering based on a local estimate of modularity, in accordance with an embodiment of the present invention. During operation, the thread executes an iteration of label propagation for the vertex identifiers corresponding to the thread's range of vertices (operation 652), as described in conjunction with FIG. 2. The thread then estimates the number of edges contained in a respective cluster (operation 654).

The thread then identifies the intra-range edges whose source and destination vertex identifiers correspond to the thread's range of vertices (operation 654). The thread also identifies the inter-range edges whose source and destination vertex identifiers correspond to the thread's range of vertices, and destination vertex identifiers are outside of the thread's range of vertices (operation 658). The thread then identifies intra-cluster-intra-range edges whose source and destination vertex identifiers correspond to a cluster and the thread's range of vertices (operation 660). Based on the identified edges, the thread estimates the number of intra-cluster-inter-range edges whose source and destination vertex identifiers correspond to a cluster, and whose source vertex identifiers correspond to the thread's range of vertices and whose destination vertex identifiers do not (operation 662). In some embodiments, the thread estimates the number of intra-cluster-inter-range edges as: (1+number of inter-range edges/number of intra-range edges)*number of intra-cluster-intra-range edges. The thread then calculates the intra-cluster edges for a respective cluster based on the inter-cluster-intra-range and intra-cluster-inter-range edges (operation 664). In some embodiments, the thread calculates the intra-cluster edges as: number of intra-cluster-intra-range edges+number of intra-cluster-inter-range edges.

The thread then calculates the current cluster assignment of the respective vertex (operation 666). However, the clusters often have exemplars with identifiers outside of the thread's range of vertices. In some embodiments, the thread uses a hash table to keep track of the number of vertices assigned to a respective cluster referenced in the thread's range of vertices. In some further embodiments, the system estimates the number of vertices in each cluster. To do so, the system assigns a block of memory for the thread's range of vertices. This memory block can contain the estimated count of vertices in the clusters referenced in the thread's range of vertices. In this way, the thread can easily access the number of vertices assigned to a respective cluster. For ease of calculation, in some embodiments, the number of vertices in the memory block is rounded up to the next power of 2. Once all of the vertex counts have been calculated, the square of each count is summed. An estimate of the number of vertices in the memory block can be addressed using the least significant bits of the cluster identifier (i.e., the vertex identifier indicating the corresponding cluster) assigned to the vertices corresponding to the thread's range of vertices.

Based on the estimations, a respective thread of the system independently calculates a local modularity for detecting convergence (operation 668) and checks whether the convergence has been reached by determining whether the local modularity has been reached a peak for the thread (operation 670). In some embodiments, the thread checks for convergence by checking whether the modularity has stopped increasing at a desired rate. If the convergence has not been reached, the thread executes another iteration of label propagation for the vertex identifiers corresponding to the thread's range of vertices (operation 652) and continues to estimate the number of edges contained in a respective cluster, and identify the intra-range and inter-range edges (operations 654, 656, and 658). If the convergence has been reached, the thread reports the cluster assignment (operation 672). In some embodiments, the thread writes the cluster assignment to a common array (i.e., an array accessible to a respective thread) to report the cluster assignment.

Greedy-Mode-Based Label Propagation

Figure 7:
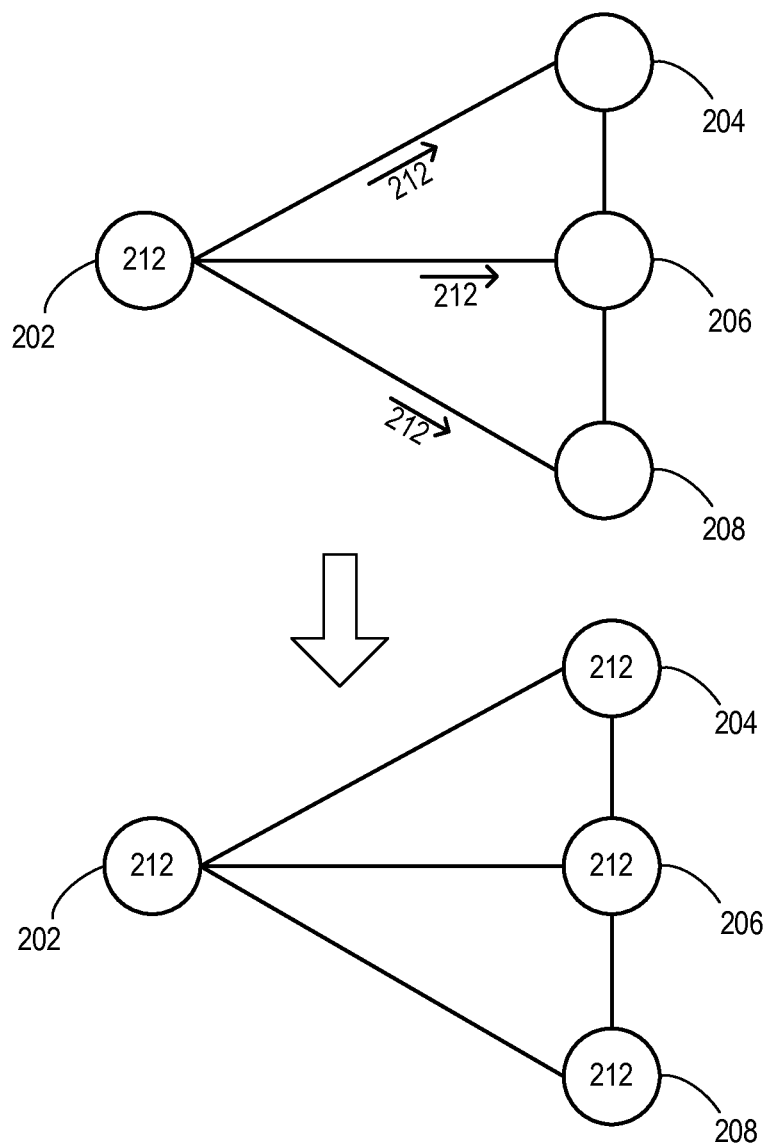
FIG. 7 illustrates an exemplary greedy-mode-based label propagation for graph clustering, in accordance with an embodiment of the present invention.

In the example in FIG. 2, vertex 202 can be referred to as the seed vertex or the exemplar of the cluster. The system uses the label 212 (i.e., vertex identifier 212) of seed vertex 202 for greedy-mode-based label propagation and to form new clusters. FIG. 7 illustrates an exemplary greedy-mode-based label propagation for graph clustering, in accordance with an embodiment of the present invention. During operation, the system forms (or receives) vertices 202, 204, 206, and 208 from a data set and allocate labels 212 to seed vertex 202 while vertices 204, 206, and 208 remain without identifiers. In this way, the system can assign a label to vertices 204, 206, and 208, which monotonically converges without any other considerations.

In some embodiments, the system assigns a "dummy" identifier, which can be disregarded by other vertices, to vertices 204, 206, and 208. The system uses the weight of the edges between these vertices for mode-based label propagation. The system determines that vertex 202 already has a label, so does not calculate a new label. Hence, vertex 202 disregards any input from vertices 204, 206, and 208. On the other hand, the system determines that vertices 204, 206, and 208 do not have labels and are most strongly related to vertex 202, propagates label 212 of vertex 202 to vertices 204, 206, and 208, and assigns label 212 to vertices 204, 206, and 208. After this iteration, vertices 202, 204, 206, and 208 have the same label 212. The system then checks convergence of the label propagation, determines that all vertices have labels, and determines that convergence has been achieved. Through this greedy-mode-based label propagation, one cluster is formed, all of whose vertices are associated with label 212. In this cluster, vertex 202 can be referred to as the seed vertex or the exemplar of the cluster. In some embodiments, once vertices 204, 206, and 208 are assigned to the cluster, vertices 204, 206, and 208 may not change clusters. This allows the greedy-mode-based label propagation to operate fast because the inputs from the unassigned vertices are disregarded. Furthermore, the graph clustering using greedy-mode-based label propagation can operate without oscillation and, consequently, terminate quickly.

Figure 8A:
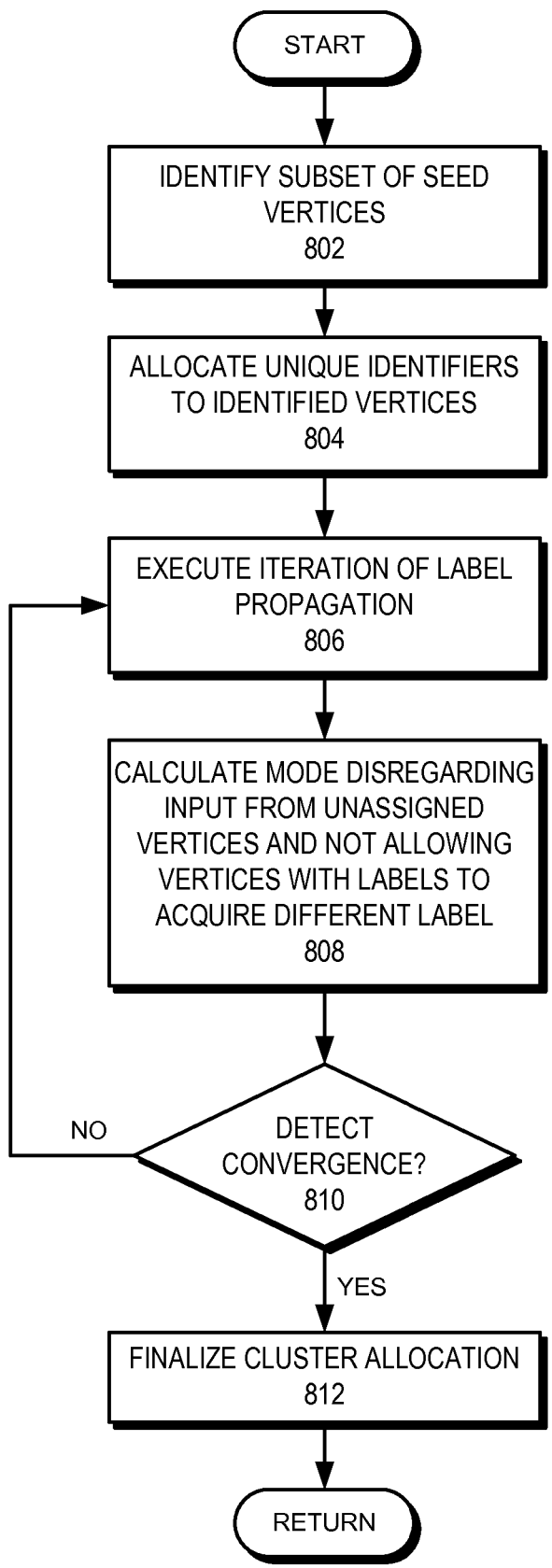
FIG. 8A presents a flowchart illustrating the graph clustering process of an information of interest detection system based on greedy-mode-based label propagation, in accordance with an embodiment of the present invention.

FIG. 8A presents a flowchart illustrating the graph clustering process of an information of interest detection system based on greedy-mode-based label propagation, in accordance with an embodiment of the present invention. Upon identifying the subset of seed vertices (operation 802), the system allocates unique identifiers to the identified vertices (operation 804) while keeping the rest of the vertices unassigned (i.e., does not assign identifier). The system executes an iteration of label propagation (operation 806), and calculates the mode while disregarding inputs from unassigned vertices and not allowing vertices with labels to acquire different labels (operation 808). The system then checks whether convergence has been detected (operation 810). If not, the system executes another iteration of label propagation (operation 806). Otherwise, the system finalizes the cluster allocation (operation 812). Note that, in graph clustering using greedy-mode-based label propagation, cluster allocation for a vertex does not change.

On the other hand, when the system only uses greedy-mode-based label propagation, some vertices can be in separate clusters from than their natural cluster members (i.e., these vertices are in a cluster other than the desired cluster for the vertices), leading to an undesired cluster formation. In a group of vertices which are desired to be in the same cluster, one vertex can be associated with one seed vertex while the others can be associated with another seed vertex. In other words, a vertex can have a weaker relationship with the other vertices in its cluster than with the vertices in other clusters. To mitigate this effect, the system can run mode-based label propagation on the results of greedy-mode-based label propagation. That combination allows individual vertices to be pulled to more suitable clusters.

Figure 8B:
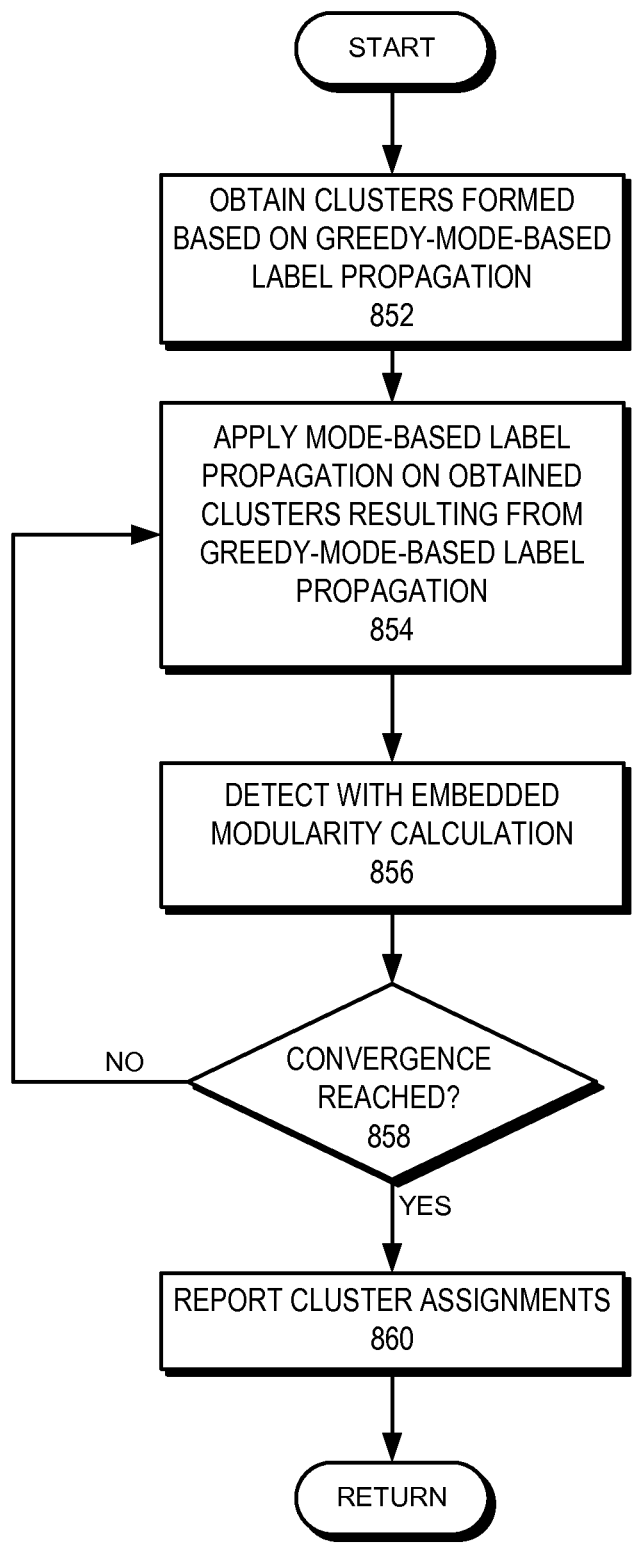
FIG. 8B presents a flowchart illustrating the graph clustering process of an information of interest detection system based on a combination of greedy-mode-based and mode-based label propagation, in accordance with an embodiment of the present invention.

FIG. 8B presents a flowchart illustrating the graph clustering process of an information of interest detection system based on a combination of greedy-mode-based and mode-based label propagation, in accordance with an embodiment of the present invention. The system first obtains the clusters formed based on greedy-mode-based label propagation (operation 852), as described in conjunction with FIG. 8A. The system applies mode-based label propagation on the obtained clusters resulting from the greedy-mode-based label propagation (operation 854), as described in conjunction with FIG. 3. The system then calculates the convergence for mode-based graph clustering based on a query with embedded modularity calculation (operation 856), as described in conjunction with FIG. 6A. The system checks whether the convergence has been reached (operation 858) by checking whether the modularity has reached a peak (operation 858). If the convergence has not been reached, the system continues to run mode-based label propagation (operation 854). Otherwise, the system reports the cluster assignments (operation 860).

Adjustable Modularity Maximization

Figure 9A:
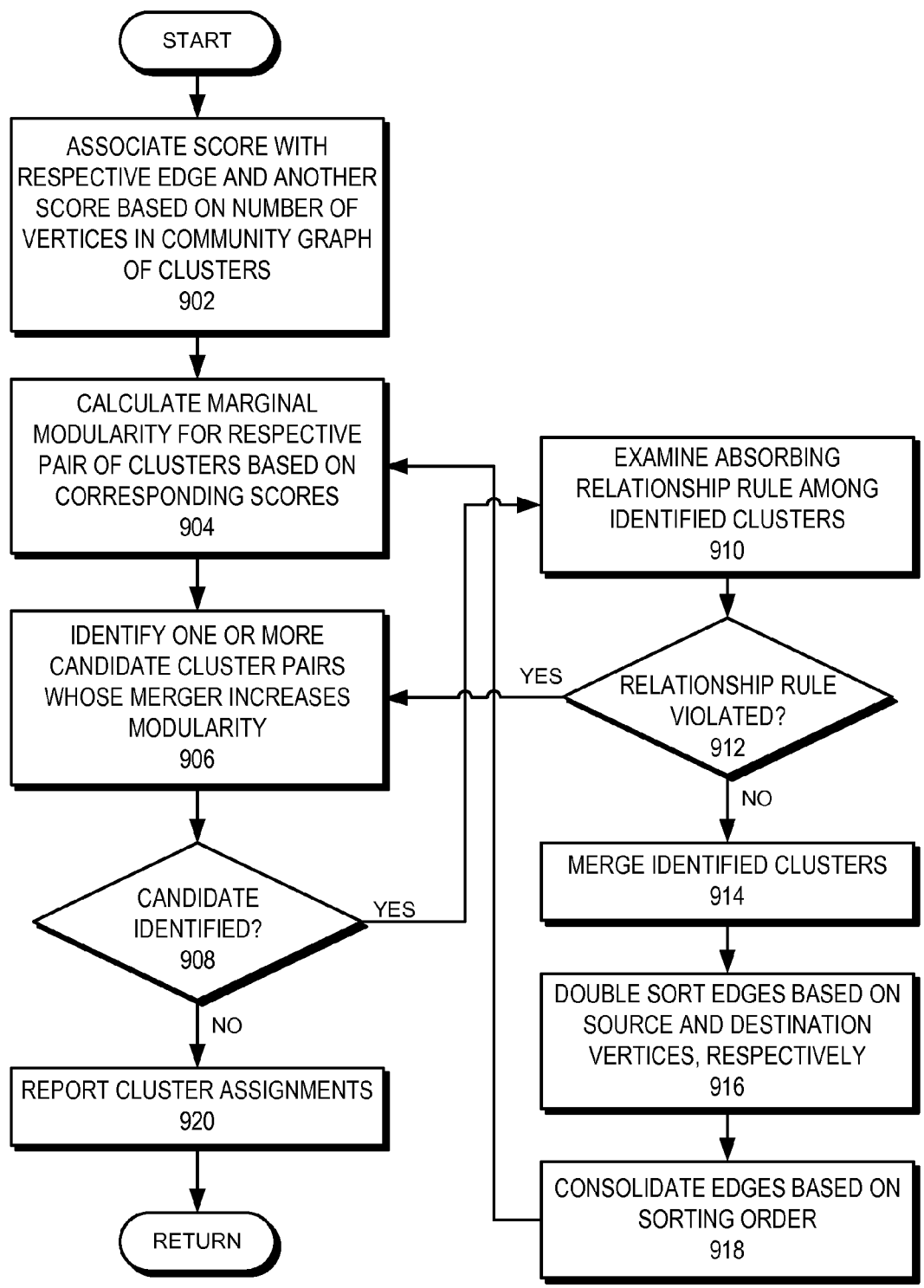
FIG. 9A presents a flowchart illustrating the graph clustering process of an information of interest detection system based on adjustable modularity maximization, in accordance with an embodiment of the present invention.

FIG. 9A presents a flowchart illustrating the graph clustering process of an information of interest detection system based on adjustable modularity maximization, in accordance with an embodiment of the present invention. During operation, the system associates a score with a respective edge and another score based on the number of vertices in a respective cluster in a community graph of clusters (operation 902). A community graph represents a cluster as a vertex and the score of an edge indicates the strength of the relationship between two clusters. The system calculates the marginal modularity for a respective pair of clusters based on corresponding scores (operation 904) and identifies the one or more candidate clusters whose merger increases modularity (operation 906). In some embodiments, if the highest marginal modularity between a cluster that appears as the source vertex for a set of edges in the community graph and a set of clusters that appear as destination vertices for the same set of edges is positive, the corresponding clusters are merged immediately.

The system computes the marginal modularity from only the weight of the edge between the two clusters and the weights of the two clusters (i.e., sum of the weighted vertices in the two clusters). In some embodiments, the marginal modularity is calculated as: (weight of edges between candidate clusters/weight of all edges in the graph)−(((weight of first candidate cluster)*(weight of second candidate cluster))/(2*(weight of all edges)$^n$)). The system allows the value of n to be adjusted. For example, if n is smaller than 2, the marginal modularity becomes smaller. This reduces the perceived modularity improvement in merging clusters, so fewer clusters are merged. Similarly, if n is greater than 2, more clusters are merged.

The system then checks whether the candidate cluster pairs has been identified (operation 908). If so, the system examines the absorbing relationship rule among the identified cluster (operation 910) and checks whether the absorbing relationship rule has been violated (operation 912). In some embodiments, the absorbing relationship rule indicates that, in a single iteration, a single cluster can absorb multiple clusters if the surviving cluster is not absorbed in that iteration. In other embodiments, two clusters cannot be merged if either one has absorbed or been absorbed in the current iteration. If the absorbing relationship rule has been violated, the system identifies another set of clusters whose merger maximizes modularity (operation 906). Otherwise, the system merges the identified clusters (operation 914).

In some embodiments, to represent the community graph, the system maintains an array for storing the edges. The system can also maintain another array, wherein a respective array entry corresponds to a list of cluster properties. The system can double sort the edges based on the source and destination vertices, respectively (operation 916). In this double sort, the system sorts the edges first based on the source vertices, and then based on the destination vertices. The system consolidates the edges based on the sorting order (operation 918). This allows the system to consolidate both edge and vertex arrays, and delete consolidated edges and absorbed clusters. In this way, the arrays can fit into the processor caches of the system in only a few iterations. The system then continues to calculate the marginal modularity for respective pairs of clusters based on corresponding scores (operation 904) and identify the one or more clusters whose merger maximizes modularity (operation 906). If no candidate cluster pairs has been identified (operation 908), the system reports the cluster assignment (operation 920).

Figure 9B:
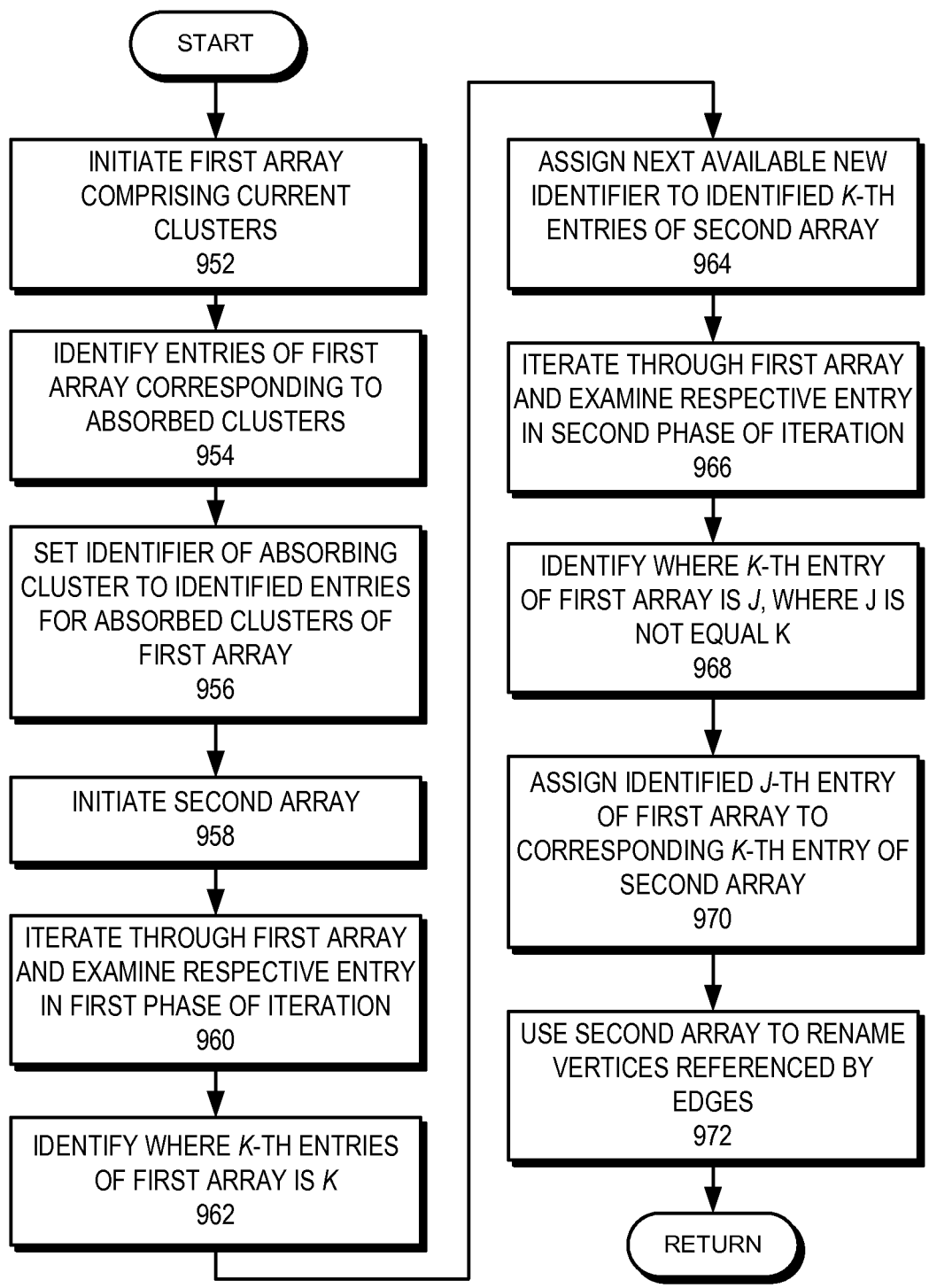
FIG. 9B presents a flowchart illustrating the process of an information of interest detection system renaming the references to vertices and edges, in accordance with an embodiment of the present invention.

In order to compact the data structures and quickly access the data structures, all vertex and edge references should be renamed at the end of each iteration. FIG. 9B presents a flowchart illustrating the process of an information of interest detection system renaming the references to vertices and edges, in accordance with an embodiment of the present invention. During operation, the system initiates a first array comprising the current clusters (operation 952).

The system identifies the entries of the first array corresponding to the absorbed clusters (operation 954), as described in conjunction with FIG. 9A. The system sets the identifier of the absorbing cluster to the identified entries for the absorbed clusters of the first array (operation 956). The system then initiates a second array (operation 958), and iterates through the first array and examines a respective entry of the first array in a first phase of iteration (operation 960). In this first phrase of iteration, the system identifies where the k-th entries of the first array is k. (operation 962). The system then assigns the next available new identifier to the identified k-th entries (i.e., corresponding to operation 962) of the second array (operation 964). In some embodiments, the system initiates a counter for the renaming process, uses this counter to assign the new identifier, and increments the counter after a respective assignment. In this way, the system assigns new identifiers to the surviving clusters.

The system then iterates over the first array again in a second phrase and examines a respective entry of the first array in the second phase of iteration (operation 960). In this second phrase of iteration, the system identifies where the k-th entries of the first array is j, where j is not equal k (operation 968). The system then assigns the identified j-th entries of the first array to the corresponding k-th entries (i.e., corresponding to operation 968) of the second array (operation 970). After the second phase of iteration, the system uses the second array to rename the vertices referenced by the edges (operation 972).

Exemplary System

Figure 10:
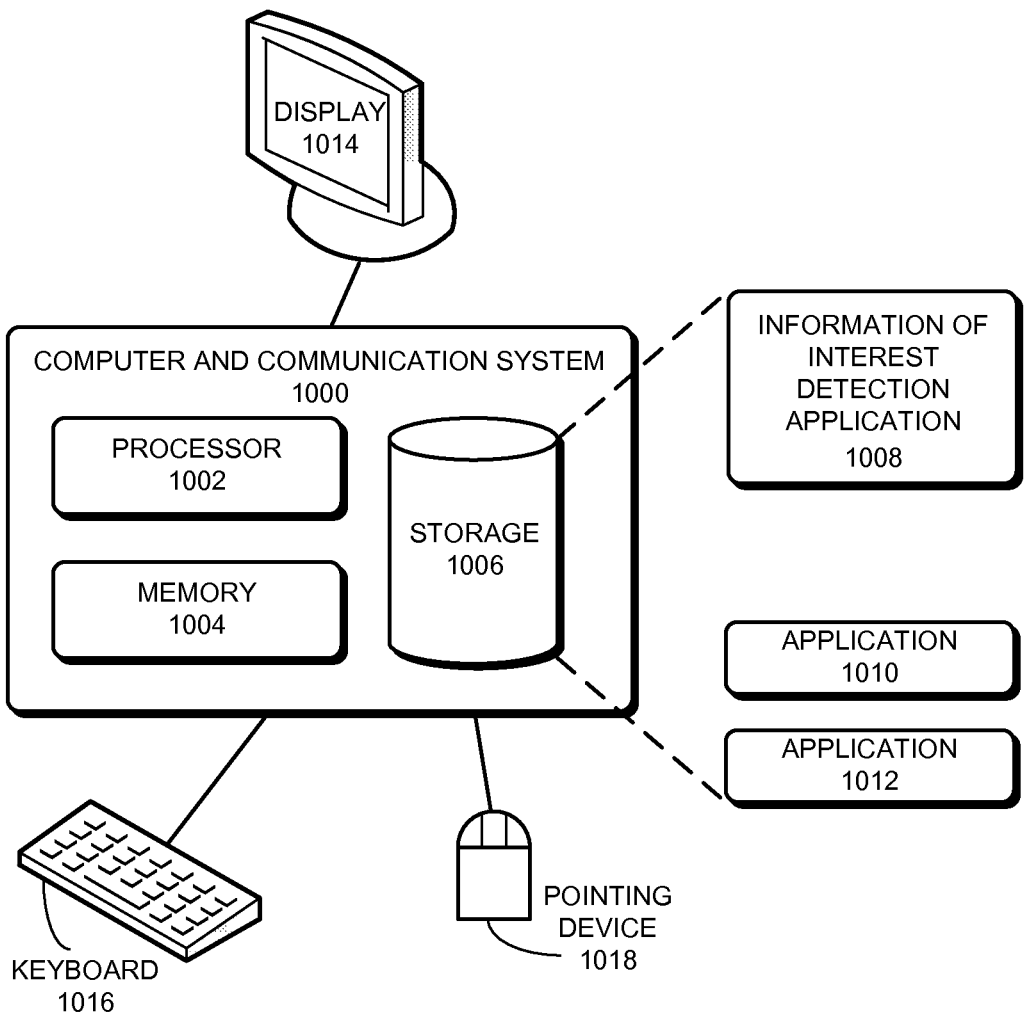
FIG. 10 illustrates an exemplary information of interest detection system, in accordance with an embodiment of the present invention.

FIG. 10 illustrates an exemplary information of interest detection system, in accordance with an embodiment of the present invention. In one embodiment, a computer and communication system 1000 operates as an information of interest detection system. Computer and communication system 1000 includes a processor 1002, a memory 1004, and a storage device 1006. Storage device 1006 stores an information of interest detection application 1008, as well as other applications, such as applications 1010 and 1012. During operation, information of interest detection application 1008 is loaded from storage device 1006 into memory 1004 and then executed by processor 1002. While executing the program, processor 1002 performs the aforementioned functions. Computer and communication system 1000 is coupled to an optional display 1014, keyboard 1016, and pointing device 1018. In some embodiments, interest detection application 1008 can be executed on a plurality of computer and communication systems, which are able to exchange data that describes the state of the operation associated with interest detection application 1008.

Note that the above-mentioned modules can be implemented in hardware as well as in software. In one embodiment, these modules can be embodied in computer-executable instructions stored in a memory which is coupled to one or more processors in computer and communication system 1000. When executed, these instructions cause the processor(s) to perform the aforementioned functions.

In summary, embodiments of the present invention provide a computer system and a method for detecting information of interest. In one embodiment, the computing system includes a processor and a computer-readable storage medium. The computer-readable storage medium stores instructions which when executed by the processor cause the processor to perform a method. The method comprises assigning a vertex identifier of a first vertex to a second vertex in a graph based on an edge between the first vertex and the second vertex. The vertices represent elements in a data set, the edge represents a type and strength of relationship between the vertices. The method further comprises allocating the first vertex and the second vertex to a vertex cluster associated with the vertex identifier, and converging the vertex cluster based on modularity associated with the vertex cluster. The vertex cluster represents information of interest in the data set.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executable method, comprising:
identifying for a first graph clustering, by a computer, a first set of vertices in a graph, wherein a respective vertex in the first set of vertices is an exemplar of a respective vertex cluster and a vertex identifier of the vertex identifies the corresponding vertex cluster;
identifying a second set of vertices in the graph, wherein a respective vertex in the second set of vertices is not an exemplar of a vertex cluster and the vertex is not associated with a vertex identifier;
assigning a vertex identifier of a first vertex in the first set of vertices to a second vertex in the second set of vertices based on an edge between the first vertex and the second vertex, wherein the first vertex and the second vertex represent element in a data set, and wherein the edge represent a type and strength of relationship between the first vertex and the second vertex;
wherein the vertex identifiers of the first vertex and the second vertex do not change before convergence;
disregarding input from a respective vertex without a vertex identifier for calculation of mode used for assigning a respective vertex identifier a respective vertex in the graph;
allocating the first vertex and the second vertex to a first vertex cluster associated with the vertex identifier, wherein the vertex cluster represents information of interest in the data set; and
detecting convergence of the first graph clustering based on allocation of vertex identifier to a respective vertex in the second set of vertices.

2. The method of claim 1, wherein in response to an undesired cluster formation, the method further comprises using the first graph clustering as an input to a second graph clustering, wherein the second graph clustering comprises:
assigning a second vertex identifier to the second vertex based on the mode of the vertex identifiers that have been assigned to neighbor vertices of the second vertex;
allocating the second vertex to a second vertex cluster associated with the second vertex identifier, wherein the second vertex cluster represents information of interest in the data set; and
detecting convergence of the second graph clustering based on modularity associated with updated vertex clusters of the graph, wherein the updated vertex clusters of the graph include the second vertex cluster.

3. The method of claim 1, further comprising allocating a subset of vertices in the graph to a thread running in the computer for forming vertex clusters, wherein forming the vertex clusters for the subset of vertices is computed within the thread.

4. The method of claim 1, further comprising:
representing a plurality of vertex clusters as vertices in a community graph;
computing marginal modularity for respective candidate vertex cluster pair in a community graph; and
merging two or more vertex clusters based on the marginal modularity.

5. The method of claim 4, wherein computing the marginal modularity is based on one or more of:
weight of edges between the candidate clusters;
weight of all edges in the community graph; and
weight of a respective candidate cluster.

6. The method of claim 5, further comprising adjusting affect of the weight of all edges in the community graph on the marginal modularity, wherein the affect includes formation of large clusters or formation of small clusters.

7. The method of claim 4, further comprising removing consolidating edges and merged clusters.

8. The method of claim 4, further comprising renaming vertices and edge references to the vertices in the community graph.

9. The method of claim 1, further comprising applying an oscillation damping effect.

10. A non-transitory computer-readable storage medium storing instructions that when executed by a computer cause the computer to perform a method, the method comprising:
identifying for a first graph clustering a first set of vertices in a graph, wherein a respective vertex in the first set of vertices is an exemplar of a respective vertex cluster and a vertex identifier of the vertex identifies the corresponding vertex cluster;
identifying a second set of vertices in the graph, wherein a respective vertex in the second set of vertices is not an exemplar of a vertex cluster and the vertex is not associated with a vertex identifier;
assigning a vertex identifier of a first vertex in the first set of vertices to a second vertex in the second set of vertices based on an edge between the first vertex and the second vertex, wherein the first vertex and the second vertex represent element in a data set, and wherein the edge represent a type and strength of relationship between the first vertex and the second vertex;
wherein the vertex identifiers of the first vertex and the second vertex do not change before convergence;
disregarding input from a respective vertex without a vertex identifier for calculation of mode used for assigning a respective vertex identifier a respective vertex in a graph;
allocating the first vertex and the second vertex to a first vertex cluster associated with the vertex identifier, wherein the vertex cluster represents information of interest in the data set; and
detecting convergence of the first graph clustering based on allocation of vertex identifier to a respective vertex in the second set of vertices.

11. The non-transitory computer-readable storage medium of claim 10, wherein in response to an undesired cluster formation, the method further comprises using the first graph clustering as an input to a second graph clustering, wherein the second graph clustering comprises:
assigning a second vertex identifier to the second vertex based on the mode of the vertex identifiers that have been assigned to neighbor vertices of the second vertex;
allocating the second vertex to a second vertex cluster associated with the second vertex identifier, wherein the second vertex cluster represents information of interest in the data set; and
detecting convergence of the second graph clustering based on modularity associated with updated vertex clusters of the graph, wherein the updated vertex clusters of the graph include the second vertex cluster.

12. The non-transitory computer-readable storage medium of claim 10, wherein the method further comprises allocating a subset of vertices in the graph to a thread running in the computer for forming vertex clusters, wherein forming the vertex clusters for the subset of vertices is computed within the thread.

13. The non-transitory computer-readable storage medium of claim 10, wherein the method further comprises:
  representing a plurality of vertex clusters as vertices in a community graph;
  computing marginal modularity for respective candidate vertex cluster pair in a community graph; and
  merging two or more vertex clusters based on the marginal modularity.

14. The non-transitory computer-readable storage medium of claim 13, wherein computing the marginal modularity is based on one or more of:
  weight of edges between the candidate clusters;
  weight of all edges in the community graph; and
  weight of a respective candidate cluster.

15. The non-transitory computer-readable storage medium of claim 14, wherein the method further comprises adjusting affect of the weight of all edges in the community graph on the marginal modularity, wherein the affect includes formation of large clusters or formation of small clusters.

16. The non-transitory computer-readable storage medium of claim 13, wherein the method further comprises removing consolidating edges and merged clusters.

17. A computing system, comprising:
  a processor;
  a memory;
  a clustering mechanism configured to:
    identify for a first graph clustering a first set of vertices in a graph, wherein a respective vertex in the first set of vertices is an exemplar of a respective vertex cluster and a vertex identifier of the vertex identifies the corresponding vertex cluster;
    identify a second set of vertices in the graph, wherein a respective vertex in the second set of vertices is not an exemplar of a vertex cluster and the vertex is not associated with a vertex identifier;
    assign a vertex identifier of a first vertex in the first set of vertices to a second vertex in the second set of vertices based on an edge between the first vertex and the second vertex, wherein the first vertex and the second vertex represent element in a data set, and wherein the edge represent a type and strength of relationship between the first vertex and the second vertex; and
    wherein the vertex identifiers of the first vertex and the second vertex do not change before convergence; and
  a convergence mechanism configured to:
    disregard input from a respective vertex without a vertex identifier for calculation of mode used for assigning a respective vertex identifier a respective vertex in a graph;
  wherein the clustering mechanism is further configured to allocate the first vertex and the second vertex to a first vertex cluster associated with the vertex identifier, wherein the vertex cluster represents information of interest in the data set;
  and
  wherein the convergence mechanism is further configured to detect convergence of the first graph clustering based on allocation of vertex identifier to a respective vertex in the second set of vertices.

18. The computing system of claim 17, wherein in response to an undesired cluster formation, the clustering mechanism is further configured to use the first graph clustering as an input to a second graph clustering;
  wherein for the second graph clustering the clustering mechanism is further configured to:
    assign a second vertex identifier to the second vertex based on the mode of the vertex identifiers that have been assigned to neighbor vertices of the second vertex; and
    allocate the second vertex to a second vertex cluster associated with the second vertex identifier, wherein the second vertex cluster represents information of interest in the data set;
  and
  wherein for the second graph clustering the convergence mechanism is further configured to detect convergence of the second graph clustering based on modularity associated with updated vertex clusters of the graph, wherein the updated vertex clusters of the graph include the second vertex cluster.

19. The computing system of claim 17, further comprising a thread management mechanism configured to allocate a subset of vertices in the graph to a thread running in the computer for forming vertex clusters, wherein forming the vertex clusters for the subset of vertices is computed within the thread.

20. The computing system of claim 17, wherein the clustering mechanism is further configured to:
  represent a plurality of vertex clusters as vertices in a community graph;
  compute marginal modularity for respective candidate vertex cluster pair in a community graph; and
  merge two or more vertex clusters based on the marginal modularity.

21. The computing system of claim 20, the clustering mechanism is configured to compute the marginal modularity based on one or more of:
  weight of edges between the candidate clusters;
  weight of all edges in the community graph; and
  weight of a respective candidate cluster.

22. The computing system of claim 21, wherein the clustering mechanism is further configured to adjust affect of the weight of all edges in the community graph on the marginal modularity, wherein the affect includes formation of large clusters or formation of small clusters.

23. The method of claim 9, wherein the oscillation damping effect include one or more of: randomization in label propagation, periodic bias, and oscillation detection.

24. The non-transitory computer-readable storage medium of claim 10, wherein the method further comprises applying an oscillation damping effect, wherein the oscillation damping effect include one or more of:
  randomization in label propagation, periodic bias, and oscillation detection.

25. The computing system of claim 17, wherein the convergence mechanism is further configured to apply an oscillation damping effect, wherein the oscillation damping effect include one or more of:
  randomization in label propagation, periodic bias, and oscillation detection.

* * * * *